(12) United States Patent
Bellantoni

(10) Patent No.: US 7,197,279 B2
(45) Date of Patent: Mar. 27, 2007

(54) MULTIPROTOCOL RFID READER

(75) Inventor: John Vincent Bellantoni, Redwood City, CA (US)

(73) Assignee: WJ Communications, Inc., San Jose, CA (US)

( * ) Notice: Subject to any disclaimer, the term of this patent is extended or adjusted under 35 U.S.C. 154(b) by 0 days.

(21) Appl. No.: 11/021,302

(22) Filed: Dec. 23, 2004

(65) Prior Publication Data

US 2005/0231367 A1 Oct. 20, 2005

Related U.S. Application Data

(60) Provisional application No. 60/605,214, filed on Aug. 27, 2004, provisional application No. 60/533,970, filed on Dec. 31, 2003.

(51) Int. Cl.
*H04B 1/40* (2006.01)
*H04B 1/59* (2006.01)

(52) U.S. Cl. .............. 455/41.2; 455/323; 455/303; 375/334

(58) Field of Classification Search .......... 455/347, 455/344, 127.1, 127.2, 108, 101, 227, 272, 455/273, 277.1, 276.1, 280, 285, 288, 323, 455/334, 378; 375/320, 300, 334, 303
See application file for complete search history.

(56) References Cited

U.S. PATENT DOCUMENTS

| | | | |
|---|---|---|---|
| 1,850,187 A | 3/1932 | Thewes | |
| 2,107,910 A | 2/1938 | Schumacher | |
| 2,114,971 A | 4/1938 | Segeler | |
| 3,659,227 A | 4/1972 | Whistler | |
| 5,023,935 A | 6/1991 | Vancraeynest | |
| 5,241,566 A * | 8/1993 | Jackson | 375/277 |
| 5,590,411 A | 12/1996 | Sroka et al. | |
| 5,710,523 A | 1/1998 | Kobayashi | |
| 5,850,187 A | 12/1998 | Carrender et al. | |
| 5,862,460 A | 1/1999 | Rich | |
| 6,002,344 A | 12/1999 | Bandy et al. | |
| 6,104,240 A | 8/2000 | Fujimoto et al. | |
| 6,107,910 A | 8/2000 | Nysen | |
| 6,114,971 A | 9/2000 | Nysen | |
| 6,266,528 B1 | 7/2001 | Farzaneh | |
| 6,275,687 B1 | 8/2001 | Lloyd | |
| 6,317,608 B1 * | 11/2001 | Glocker | 455/553.1 |

(Continued)

OTHER PUBLICATIONS

Garver, J., Excerpts from "Microwave Diode Control Devices", Harry Diamond Laboratories, Artech House, Inc. Standard Book No. 0-89006-022-3, Library of Congress Catalog Card No. 74-82596, (1976) Figs. 7-4-7-9 and Figs. 7-12-7-13, pp. 186-188 and p. 192.

(Continued)

*Primary Examiner*—Edward F. Urban
*Assistant Examiner*—Blane J. Jackson
(74) *Attorney, Agent, or Firm*—Dorsey & Whitney LLP

(57) ABSTRACT

An RFID reader accessible thorough a personal computer and includes a PC card interface and a controller both operating according to clock signals from a crystal oscillator. The RFID reader further includes a linearized power amplifier modulator in a transmit path, a receive chain capable of demodulating EPCglobal Class_1 and Class_0 signals from RFID tags, and an integrated switching device for selecting one of a plurality of antenna for transmitting or receiving RF signals.

28 Claims, 27 Drawing Sheets

U.S. PATENT DOCUMENTS

| | | | |
|---|---|---|---|
| 6,327,481 B1 | 12/2001 | Nagashima | |
| 6,529,080 B1 | 3/2003 | Seymour et al. | |
| 6,636,730 B2* | 10/2003 | Spargo et al. | 455/302 |
| 6,657,592 B2* | 12/2003 | Dening et al. | 343/700 MS |
| 6,737,973 B2 | 5/2004 | Jesme | |
| 6,774,863 B2* | 8/2004 | Shirosaka et al. | 343/797 |
| 6,837,435 B2 | 1/2005 | Kehoe et al. | |
| 6,972,626 B2* | 12/2005 | Takahashi et al. | 330/279 |
| 6,983,025 B2* | 1/2006 | Schell | 375/296 |
| 2002/0017981 A1* | 2/2002 | Turner | 340/10.34 |
| 2002/0049044 A1* | 4/2002 | Indseth | 455/118 |
| 2002/0055337 A1* | 5/2002 | Persico et al. | 455/112 |
| 2004/0069852 A1* | 4/2004 | Seppinen et al. | 235/451 |
| 2004/0160309 A1* | 8/2004 | Stilp | 340/10.2 |
| 2004/0203478 A1* | 10/2004 | Scott | 455/70 |
| 2005/0027604 A1* | 2/2005 | Bandy et al. | 705/22 |
| 2005/0087599 A1* | 4/2005 | Ward et al. | 235/451 |
| 2005/0210173 A1* | 9/2005 | Kehoe et al. | 710/260 |

OTHER PUBLICATIONS

Hill, Joseph C., et al., "PIN Diode Switches Handle High-Power Applications", Reprinted from Microwave Systems News—Technical Feature, (Jun. 1989) pp. 1-6.

Waugh, Raymond W., "SPDT Switch Serves PCN Applications—Minimal Loss, High Isolation, and Low Cost Were Driving Forces in the Design of this Battery-Powered Transmit/Receive Switch", Microwaves & RF—Design Feature, (Jan. 1994) pp. 111-118.

White, Joseph F., Excerpts from "Microwave Semiconductor Engineering", Van Nostrand Reinhold Company, (1982) Fig. VIII-49 p. 373.

Iwai, T., "42% High-Efficiency Two-Stage HBT Power-Amplifier MMIC for W-CDMA Cellular Phone Systems," IEEE Trans Microwave Theory & Techniques, vol. 48#12, (2000) p. 2567.

Jeon, Y. et al., " Improved HBT Linearity with a Post-Distortion-Type Collector Linearizer", IEEE Microwave and Wireless Components Ltters, vol. 13#13 (2003) p. 102.

Kang, S., et al., "Linearity Analysis of CMOS for RF Application", IEEE Radio Frequency Integrated Circuits Symposium, Paper TU4A-5, (2002) p. 363.

Kawamura, H., et al., "A Miniature 44% Efficiency GaAs HBT Power Amplifier MMIC for the W-CDMA Application", IEEE GaAs Digest, (2000) p. 25.

Kim, et al.,"A 5-GHZ LNA for Wireless LAN Application Based On 0.5 Micron SiGe BiMOS", IEEE 3rd International Conference on Microwave and Millimeter Wave Technology, (2003) p. 50.

Kim, et al., "High Linear Hbt Mmic Power Amplifier With Partial Rf Coupling To Bias Circuit For W-Cdma Portable Applications", IEEE 3rd International Conference on Microwave and Millimeter Wave Technology, (2003) p.809.

Ko, et al., "Effect of Bias Scheme on Intermodulation Distortion and Its Use for the Design of PCS TX Driver", IEEE Radio Frequency Integrated Circuits Symposium, Paper MON3C-5, (2000) p. 105.

Noh, Y., "PCS/W-CDMA Dual-Band MMIC Power Amplifier with a Newly Proposed Linearizing Bias Circuit, " IEEE J. Soild State Circuits, 37#9 *(2002) p. 1096.

Taniguchi, et al., "Dual Bias Feed SiGe HBT Low Noise Linear Amplifer", IEEE Radio Frequency Integrated Circuits Symposium, Paper TUE4A-2 (2001) p. 227.

Trask, C., "High Efficiency Broadband Linear Push-Pull Power Amplifiers Using Linearity Augmentation", IEEE International Symposium on Circuits ans Systems, vol. 2:26-29 (2002) p. II-432.

Waugh, Raymond W., "SPDT Switch Serves PCN Applications-Minimal Loss, High Isolation, and Low Cost Were Driving Forces in the Design of this Battery-Powered Transmit/Recieve Switch", Microwaves & RF-Design Feature, (Jan. 1994) pp. 111-118.

Yoshimasu, et al., "An HBT MMIC Power Amplifier with an Integrated Diode Linearizer for Low-Voltage Portable Phone Applications", IEEE J. Solid State Circuits, vol. 33#9 (1998) p. 1290.

* cited by examiner

MULTIPROTOCOL RFID READER

CROSS REFERENCE TO RELATED APPLICATIONS

The present application claims priority to U.S. Provisional Patent Application No. 60/533,970 filed on Dec. 31, 2003, and U.S. Provisional Patent Application No. 60/605,214 filed on Aug. 27, 2004, the entire disclosure of each of which is hereby incorporated by reference in its entirety.

The present application is related to co-pending U.S. patent application Ser. No. 11/021,302 entitled "A Linearized Power Amplifier Modulator" and U.S. patent application Ser. No. 11/021,539 entitled "Integrated Switching Device for Routing Radio Frequency Signals", both filed on Dec. 23, 2004, the entire disclosure of each of which is hereby incorporated by reference in its entirety.

FIELD OF THE INVENTION

The present invention relates in general to interrogation of radio-frequency identification (RFID) transponders, and particularly to an advanced RFID reader compatible with a PC card standard and with improved sensitivity, reduced spurs, and multi-protocol functionality.

BACKGROUND OF THE INVENTION

RFID technologies are widely used for automatic identification. A basic RFID system includes an RFID tag or transponder carrying identification data and an RFID interrogator or reader that reads and/or writes the identification data. An RFID tag typically includes a microchip for data storage and processing, and a coupling element, such as an antenna coil, for communication. Tags may be classified as active or passive. Active tags have built-in power sources while passive tags are powered by radio waves received from the reader and thus cannot initiate any communications.

An RFID reader operates by writing data into the tags or interrogating tags for their data through a radio-frequency (RF) interface. During interrogation, the reader forms and transmits RF waves, which are used by tags to generate response data according to information stored therein. The reader also detects reflected or backscattered signals from the tags at the same frequency, or, in the case of a chirped interrogation waveform, at a slightly different frequency. The reader typically detects the reflected or backscattered signal by mixing this signal with a local oscillator signal. This detection mechanism is known as homodyne architecture.

In a conventional homodyne reader, such as the one described in U.S. Pat. No. 2,114,971, two separate decoupled antennas for transmission (TX) and reception (RX) are used, resulting in increased physical size and weight of the reader, and are thus not desirable. To overcome the problem, readers with a single antenna for both TX and RX functions are developed by employing a microwave circulator or directional coupler to separate the reflected signal from the transmitted signal, such as those described in U.S. Pat. No. 2,107,910. In another U.S. Pat. No. 1,850,187, a tapped transmission line serves as both a phase shifter and directional coupler.

Recent developments in RFID systems present challenges for conventional RFID readers. First, identification data stored on tags must be sent to readers in a reliable manner. Encoding this data and transmitting it over a modulated signal are two critical components of communications between tags and readers. While data coding determines the representation of data, signal modulation determines the protocol of communications between tags and readers. There are three main classes of digital modulation: Amplitude Shift Keying (ASK) or Class 1 protocol according to the EPCglobal Standard, Frequency Shift Keying (FSK) or EPCglobal Class 0 protocol, and Phase Shift Keying (PSK). Each of these classes has its own power consumption, reliability, and bandwidth requirements. It would be desirable for an RFID reader to be able to process signals from tags using different protocols.

Other challenging issues arise from interrogating passive RFID tags because the same signal used to communicate with the tags has to be used to power the tags. Passive tags receive power from readers through mechanisms such as inductive coupling or far-field energy harvesting. The received power can be significantly reduced because of modulations in the signal. Also, modulating information into an otherwise pure sinusoidal wave spreads the signal in the frequency domain. This spread is usually referred to as "side band" and is regulated by government. The amount of information that may be sent from a reader to a tag is thus limited by these limitations on modulation.

Furthermore, RFID readers have not been made in a PC Card format so that it can be integrated in handheld, portable or laptop computers to read from and write to RFID tags. The flexibility of an RFID reader on a PC Card also allows easy integration of an intelligent long-range (ILR) system into enterprise systems and permits combination with other technologies such as bar code and wireless local area networks (LAN). A PC Card RFID reader, however, presents other challenges because RF components of a conventional reader cannot fit in a small PC card housing and the operation of a PC interface may generate spurs in the transmit channel of the reader, resulting in spurious emissions from the reader that do not comply with regulatory requirements from the government. A PC Card RFID reader also needs to be low in cost, and still highly sensitive to incoming signals.

SUMMARY OF THE INVENTION

The present invention includes an RFID reader for interrogating passive RFID tags which preferably combines small size, high sensitivity, and low cost. In one embodiment of the present invention, the reader is in a standard PC card format and includes a crystal oscillator, a frequency synthesizer referencing a clock signal from the crystal oscillator, and a PC card interface and a controller both operating according to the same clock signal from the crystal oscillator. Thus, a single crystal oscillator is used to provide clock signals to the frequency synthesizer, the PC card interface and the controller. Therefore, digital transitions in the PC card interface and the controller are synchronized with the frequency synthesizer and do not interfere with the accuracy of synthesis. Using the same crystal oscillator also greatly reduces the disturbances on the transmit functions of the reader and spurious transmissions caused by the operations of the PC card interface and the controller.

In another aspect of the invention, the RFID reader further includes a power detector that is configured to detect a reflected power in the reader and to produce two signals, one to indicate an antenna fault and another one as a feedback for adjusting the power level in a transmit signal.

In yet another aspect of the invention, the RFID reader includes a linearized power amplifier modulator for adding modulation in the transmit signal. The linearized power amplifier modulator includes a pulse-shaping filter coupled to a bias input of a linearized power amplifier. The pulse-shaping filter includes an operational amplifier and low-pass filter and is configured to transfer a square modulation pulse to a ramped pulse. The linearized power amplifier includes a bias control module, a signal input module, and a conventional power amplifier. The bias control module is configured to generate a reference current signal from the ramped pulse. The reference current signal is used by the power amplifier to amplify and modulate a continuous wave signal that is delivered to the signal input module. The linearized power amplifier modulator provides significant reduction in spurious radiation power, and consumes less DC power due to both a reduction in the required RF gain of the power amplifier and a reduction in the power consumption by the power amplifier at low bias currents.

In an alternative embodiment of the present invention, reader 100 is configured such that it can operate in a LISTEN only mode according to proposed ETSI Standard EN302 208 and includes a directional coupler having shunt switches that, when actuated, cause the reader to operate in the LISTEN mode. In the listen mode, the directional coupler becomes in one aspect a quarter-wave transformer and in another aspect a direct path from an antenna to a receive chain of the reader. So, the transmit signal does not reach the antenna and a received signal suffers only a modest loss (typically <1 dB) in traversing the directional coupler, resulting in significant improvement in the sensitivity of the reader in the LISTEN mode.

In yet another aspect of the present invention, the RFID reader allows the use of more than one antenna and includes an antenna select module having a switch element whose parasitic components are integrated into a low-pass filter prototype structure. In one embodiment of the present invention, the antenna select module includes a first filter network (network A), a second filter network (network B), a third filter network (network C), and a switch element coupled between network A and networks B and C. The switch element may be a conventional switching device configured to select either network B or network C for connection with network A. In one embodiment of the present invention, the parasitic components of the switch element are characterized to determine their values and these values are accounted for when choosing the values of the components in networks A, B, and C such that network A, B, and C and the parasitic components of the switch element are integrated into one low-pass filter prototype structure. Therefore, loss of signal strength through the antenna select module is minimized and signal quality is maximized.

In yet another embodiment of the present invention, the RFID reader includes a receive chain that is configured to receive the RF signal from the tag and generates at least one in-phase signal, at least one-quadrature signal, and at least one FSK signal, which are supplied to the controller. The controller selects the in-phase, quadrature, or FSK signals for further processing based on their relative strength and/or other indications of reliability. Therefore, the reader is a multi-protocol reader capable of interrogating class_0 and class_1 RFID tags.

In one embodiment of the present invention, the receive chain includes an in-phase branch configured to produce at least one in-phase signal, a quadrature branch configured to produce at least one quadrature signal, and an image reject mixer (IRM) configured to reject an image signal associated with the RF signal from the tag. The image reject mixer share a pair of mixers with the in-phase and quadrature branch and includes an IRM path having a pair of all-pass filters each configured to cause a different phase shift in the signal from a respective one of the pair of mixers. The all-pass-filters each include an operational amplifier. By using operational amplifiers for phase-shifting, desired phase shift can be reached while still maintaining the small-size requirement for the reader in PC card format. The IRM path further includes blocking capacitors inserted at various locations of the IRM path, an adder and a low-pass filter. The adder and low-pass filter are integrated into a low-pass filter prototype structure, and the blocking capacitors are also integrated with the rest of the components in the IRM path so that the IRM path has both high-pass and low-pass functions providing fast roll-offs outside a narrow intermediate frequency band in its frequency response.

In yet another aspect of the present invention, an optional phase shifter is placed in either the transmit or receive chain to increase sensitivity of the reader. Alternatively, dual phase shifters may be placed in in-phase and quadrature branches to achieve the same result. The phase shifter is adjusted to minimize conversion of phase modulation (or phase noise) in a local oscillator signal into amplitude noise at a baseband.

In yet another aspect of the invention, the frequency synthesizer and other RF components of the reader are turned off during an overhead time when the reader is processing data received from the tags, reducing a total power consumed by the reader.

Although various aspects of the present invention have been described in terms of components in an RFID reader, these components may be used in other applications outside of the RFID reader.

The present invention also includes a method for interrogating an RFID tag via a computer system using an RFID reader according to one embodiment of the present invention. The method comprises the steps of generating a clock signal, generating a continuous wave signal referencing the clock signal, generating a plurality of control signals, controlling the generation of control signals via a PC card interface operating based on the clock signal, and modulating the continuous wave signal according to one of the plurality of control signals.

In one embodiment of the present invention, the control signal used to modulate the continuous wave signal includes step transitions. The step of modulating the continuous wave signal comprises the further steps of generating a ramp signal according to the control signal, the ramp signal comprising linear ramps each corresponding to a step transition in the control signal, generating a reference current signal according to the ramp signal using a current mirror, supplying the reference current signal to a power amplifier receiving the continuous wave signal, and modulating the continuous wave signal according to the reference current signal using the power amplifier.

In one embodiment of the present invention, the method for interrogating the RFID tag further comprises the steps of transmitting a first continuous wave signal to the RFID tag for a first time period, transmitting a modulated signal to the RFID tag for a second time period after the first time period, maintaining continuous wave output power for a third time period to receive data from the RFID tag, the third time period being after the second time period, and while processing the data from the RFID tag during a fourth time period after the third time period, turning off RF components in the reader.

In one embodiment of the present invention, the method for interrogating the RFID tag further comprises the steps of receiving an RF signal from the RFID tag, demodulating the RF signal to generate at least one in-phase signal, at least one quadrature signal, and at least one FSK signal, and selecting the at least one in-phase signal, the at least one quadrature signal, or the at least one FSK signal to draw information included in the RF signal from the RFID tag.

In one embodiment of the present invention, the RF signal from the RFID tag is demodulated using a local oscillator signal generated at the RFID reader, and the method may further comprises an optional step of causing an adjustable phase shift in the local oscillator signal to minimize conversion of phase noise in the local oscillator signal into amplitude noise in the at least one in-phase signal, at least one quadrature signal, and at least one FSK signal.

In one embodiment of the present invention, the step of demodulating the RF signal comprises the further steps of splitting the RF signal into a first RF signal and a second RF signal, splitting the local oscillator signal into a first local oscillator signal and a second local oscillator signal, the second local oscillator signal having a 90° phase shift from the first local oscillator signal, mixing the first RF signal with the first local oscillator signal to generate a first IF signal, mixing the second RF signal with the second local oscillator signal to generate a second IF signal, causing a first phase shift in the first IF signal using a first all-pass filter and a second phase shift in the second IF signal using a second all-pass filter to result in a total of 90° phase shift between the first and second IF signals, and summing the first IF signal and the second IF signal.

DETAILED DESCRIPTION OF THE INVENTION

Figure 1A:
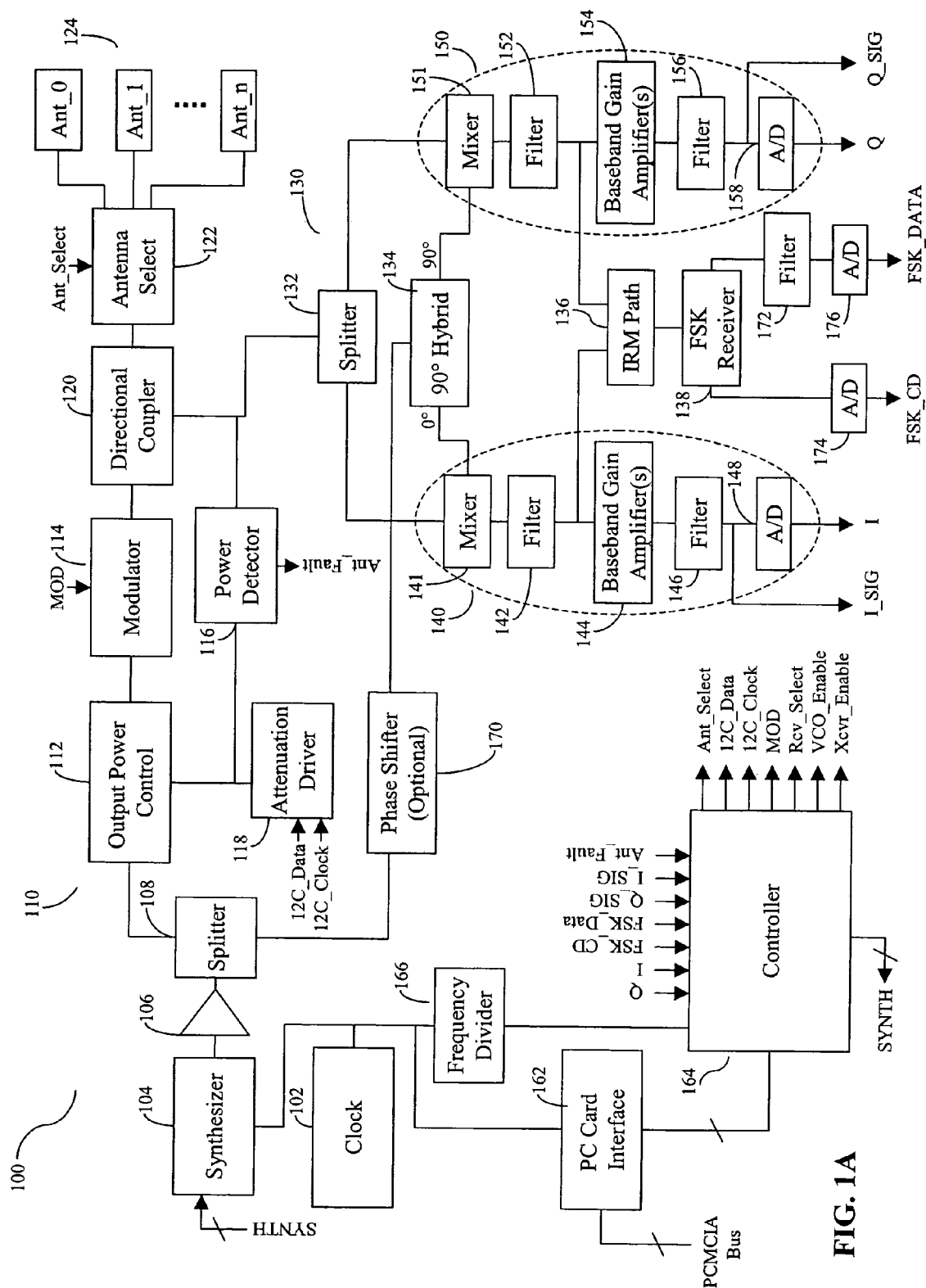
FIG. 1A is a block diagram of an RFID reader according to one embodiment of the present invention.

FIG. 1A is a block diagram of an RFID reader 100 according to one embodiment of the present invention. As shown in FIG. 1A, reader 100 includes a crystal oscillator 102 configured to generate a clock signal, and a frequency synthesizer 104 configured to generate a continuous wave (CW) signal referencing the clock signal. Reader 100 further includes a local oscillator (LO) buffer amplifier 106 coupled to synthesizer 104 and configured to amplify the CW signal. LO buffer amplifier 106 also protects the synthesizer from disturbances created from other parts of reader 100. LO buffer amplifier 106 may be implemented using conventional means.

Reader 100 further includes a transmit (TX) chain 110 configured to form and transmit a transmit (TX) signal for interrogating a tag, and a receive (RX) chain 130 configured to receive an RF signal from the tag, and to generate a plurality of output signals from the RF signal. TX chain 110 includes an output power control module 112, a modulator 114, a power detector 116 and an attenuation driver 118. RX chain 130 includes a splitter 132, a 90° hybrid 134, an I-branch 140, a Q-branch 150, an IRM path 136, an FSK receiver 138, a filter 172, analog to digital (A/D) converters 174 and 176, and an optional phase shifter 170.

Reader 100 further includes a splitter 108 coupled between LO buffer amplifier 106 and TX/RX chains 110 and 130 and configured to split the CW signal from LO buffer amplifier 106 into a TX CW signal for the TX chain and a RX LO signal for the RX chain. When more than one antenna can be used by reader 100, reader 100 may also include an antenna select module 122 configured to select one of a plurality of antenna 124 for broadcasting the TX signal or receiving the RF signal. Reader 100 further includes a directional coupler 120 coupled between antenna select module 122 and TX/RX chains 110 and 130. Directional coupler 120 is configured to pass the TX signal from the TX chain 110 to at least one antenna through antenna select module 122 and to couple the RF signals by the antenna to the RX chain 130.

Reader 100 further includes a controller 164 configured to control the operation of various components of reader 100 by processing a plurality of input signals from the various components and producing a plurality of output signals that are used by respective ones of the components. The input signals may include signals I, Q, FSK_CD, FSK_data, Q_SIG, I_SIG, Ant_Fault, and DET, and the output signals may include signals Ant_Select, 12C_Data, 12C_Clock, MOD, Rcv_Select, VCO_Enable, Xcvr_Enable, and SYNTH. The usage of these signals is discussed in more detail below. In one embodiment of the present invention, a conventional commercially available controller, after being programmed according to an RFID standard, can be used as controller 164.

Figure 1B:
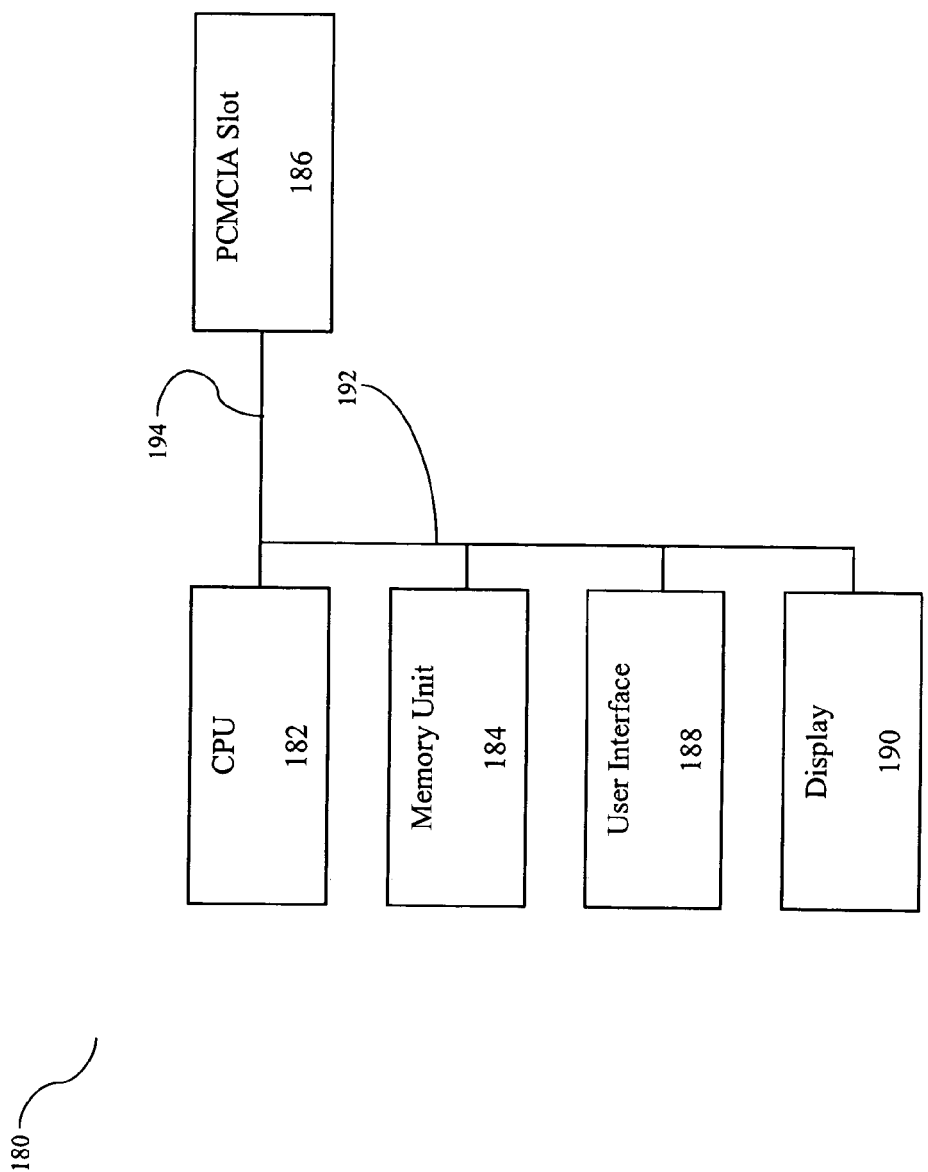
FIG. 1B is a block diagram of a computer system that can be used to operate the RFID reader.

In one embodiment of the present invention, a host computer system can be used to operate reader 100. To interface with the computer system, reader 100 further includes a PC card interface 162 configured to provide an interface between reader 100 and the host computer system. FIG. 1B is a block diagram of a computer system 180 that can be used to operate reader 100. As shown in FIG. 1B, computer system 180 is a conventional computer system including a central processing unit (CPU) 182, a memory unit 184, an PC card slot 186, a user interface 188, and a display device 190. CPU 182, memory unit 184, user interface 188, and display device 190 are interconnected via a bus 192. PC card slot 186 can be a PCMCIA slot connected to CPU 182 via bus 192 and a PCMCIA bus 194 compatible with a PCMCIA standard. Computer system 180 can be a commercially available desktop, laptop, or handheld personal computer system. In one embodiment of the present invention, reader 100 is in a PC card format, such as the Type II PC Card Format defined by the PCMCIA Standards, which can be inserted into a PCMCIA slot, such as the Type II slot specified in the PCMCIA Standards, of the computer system. To fit all of the RF components in reader 100 into a PCMCIA housing fit for insertion into a PCMCIA slot specified in a PCMCIA standard, reader 100 includes many inventive features as discussed in more detail below.

Referring back to FIG. 1A, both PC card interface 162 and controller 164 operates according to the clock signal from crystal oscillator 102. A frequency divider 166 may be provided to divide the frequency of the clock signal if controller 164 operates at a different frequency from that of PC card interface 162. For example, in one embodiment of the present invention, PC card interface 162 operates at 14.75 MHz and the controller operates at about 3–8 MHz. In this case, the frequency of oscillator 102 may be set at the frequency of the PC card, i.e., 14.75 MHz. When the frequency of oscillator 102 is set at 14.75 MHz, a ½ frequency divider 166 may be provided between crystal oscillator 102 and controller 164 to divide the 14.75 MHz oscillator frequency by half so that the controller 164 and the PC card interface 162 may operate using a single crystal oscillator 102. Note that the frequency of crystal oscillator 102 can also be set as an integer multiple of the frequency of PC card interface 162, with frequency dividers inserted between crystal oscillator 102 and PC card interface 162 and between crystal oscillator 102 and controller 164.

Figure 2:
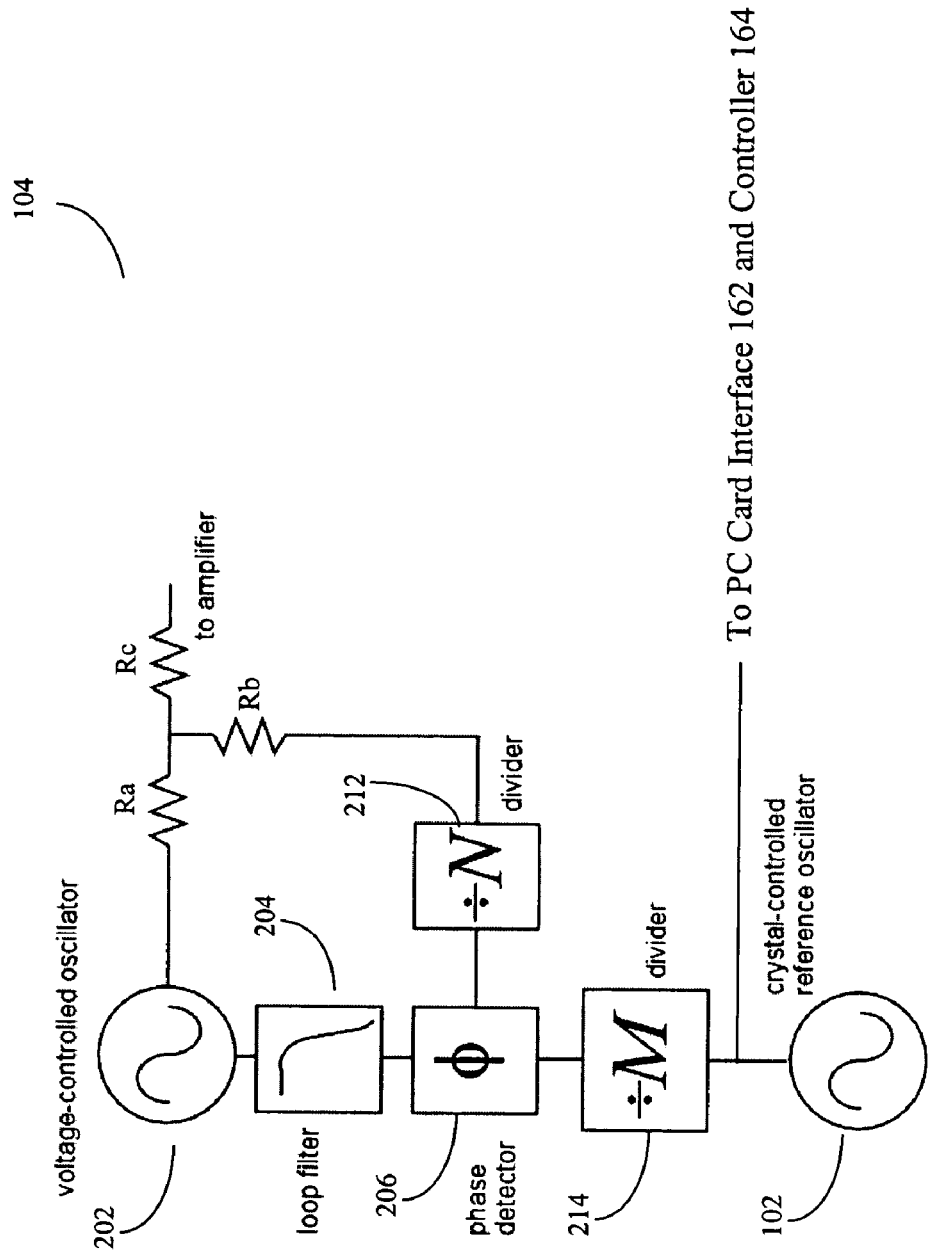
FIG. 2 is a schematic block diagram of the frequency synthesizer used in the RFID reader according to one embodiment of the present invention.

FIG. 2 includes a block diagram of frequency synthesizer 104 according to one embodiment of the present invention. As shown in FIG. 2, frequency synthesizer includes a conventional phase-locked loop (PLL) operating for example at a carrier frequency, e.g., 900 MHz, with reference to the clock signal at a much lower frequency such as 14.75 MHz. The carrier frequency is preferably near a center of one of a number of narrow frequency bands specified by regulation agencies such as the Federal Communications Commission (FCC) for RFID operations. As shown in FIG. 2, frequency synthesizer 104 includes a voltage controlled oscillator (VCO) 202 configured to generate a CW signal with a frequency near, for example, 900 MHz, a loop filter 204 coupled to the voltage controlled oscillator 202, a phase detector 206 coupled to the loop filter 204, a frequency divider 212 coupled between the voltage controlled oscillator 202 and the phase detector 206, and a frequency divider 214 coupled between the phase detector 206 and crystal oscillator 102. Resistors Ra, Rb, and Rc function to split the CW signal from VCO 202 into a first fraction for sending to LO buffer amplifier 106 and a second fraction for sending to frequency divider 212.

In one embodiment of the present invention, an 'integer-N' architecture is employed for frequency synthesis as illustrated in FIG. 2. The second fraction of the output signal of VCO 202 is delivered to frequency divider 212 where it is divided by an integer N, whose value can be adjusted to obtain different output frequencies. The reference signal from crystal oscillator 102 is delivered to frequency divider 214 where its frequency is divided by a usually fixed integer M. The outputs of frequency dividers 212 and 214 are sent to two separate inputs of phase detector 206, which is configured to compare the phases of the two signals, and to produce an output proportional to the phase difference between the two signals. Loop filter 204 is a low-pass filter configured to remove unwanted signal components from the output of phase detector 206. The output of loop filter 204 is a DC voltage, which is used to control the phase and frequency of the CW signal from VCO 202. In one embodiment of the present invention, frequency synthesizer 104 receives the SYNTH signal from controller 164, which signal is used to adjust integer N and/or interger M, and thus the output frequency.

Thus, a single crystal oscillator is used to provide the clock signal used by frequency synthesizer 104, PC card interface 162, and controller 164, so that digital transitions in PC card interface 162 and controller 164 are synchronized with frequency synthesizer 104 and thus do not interfere with the accuracy of frequency synthesis. Using the same crystal oscillator also greatly reduces the disturbances on TX chain 110 and spurious transmissions caused by the operations of PC card interface 162 and controller 164.

Referring again to FIG. 1A, in one embodiment of the present invention, in TX chain 110, output power control module 112 is configured to adjust the power level of the TX CW signal, and modulator 114 is configured to form the TX signal by modulating and amplifying the TX CW signal. During normal operations, the TX signal should travel through directional coupler 120 and antenna select module 122 and reach at least one antenna 124. A possible fault may occur, however, when reader 100 is not properly installed or when a selected antenna is actually disconnected from reader 100. During such fault, the TX signal may fail to reach the antenna and be reflected back toward TX/RX chains 110/130. The amount of power in the reflected TX signal can cause damage to components in the TX chain 110. Power detector 116 is provided to prevent this from happening. In one embodiment of the present invention, power detector 116 is configured to detect the reflected power coupled into RX chain 130 and to produce two signals, a feedback signal that goes back to the output power control module 112, and the Ant-Fault signal delivered to the controller 164 to indicate whether a fault has occurred with the antenna. The feedback signal is used by the output power control module 112 to adjust the output power accordingly, while the Ant_Fault signal is provided to the host computer system via controller 164 and PC card interface 162 as a flag for a possible antenna fault. In one embodiment of the present invention, output power control module is implemented using a conventional power attenuator driven by attenuation driver 118, which receives instructions from controller 164 in the form of signals 12C_Data and 12D_Clock.

In one embodiment of the present invention, modulator 114 in TX chain 110 receives the power adjusted TX CW signal from the output power control module 112 and amplifies and modulates the TX CW signal according to the MOD output from controller 164. A prior art modulator and amplifier(s) combination may be used as modulator 114. Prior art modulators, however, suffer from several disadvantages as discussed below.

Figure 3:
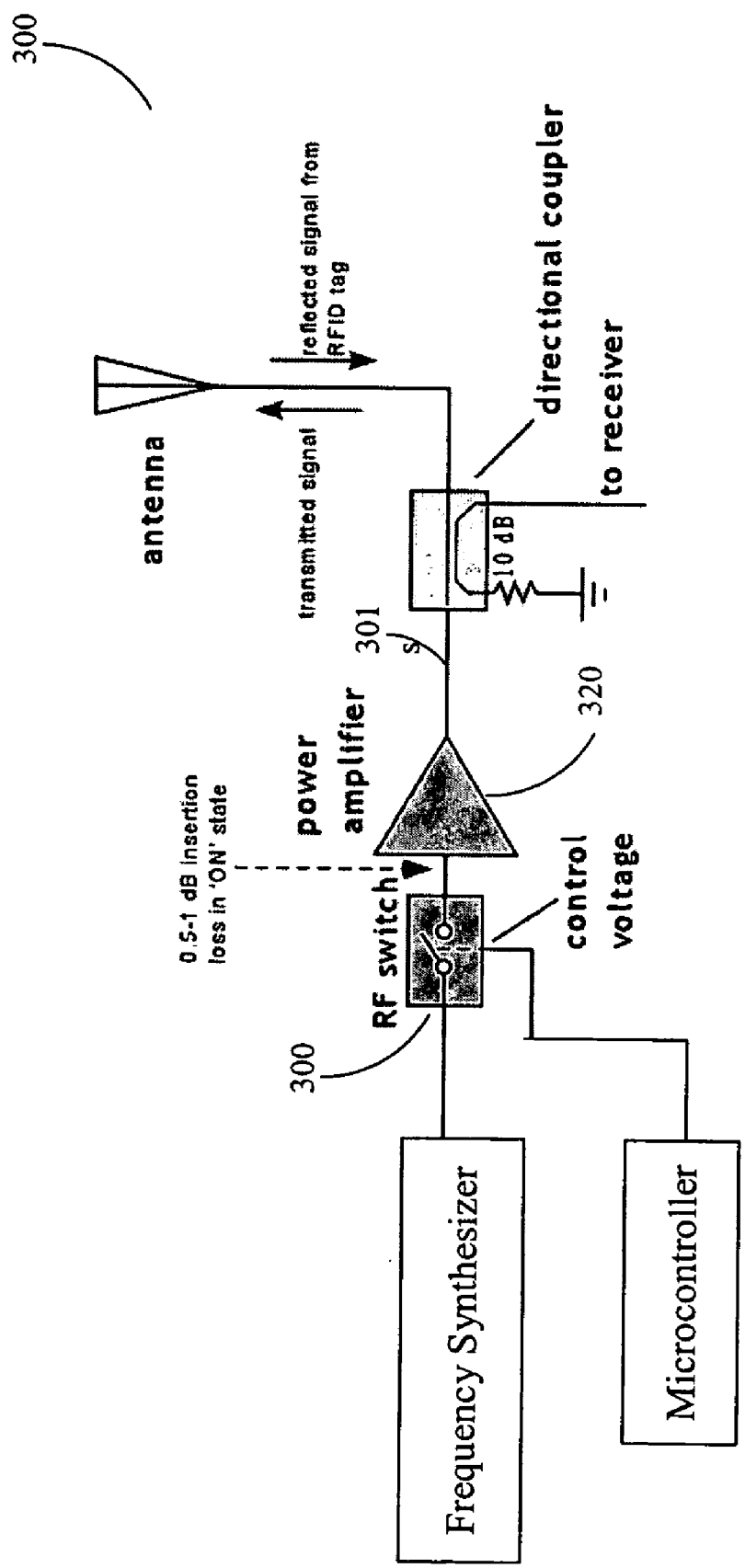
FIG. 3 is a block diagram of a prior art RF transmitter employing a modulating switch.

Current and envisioned future standards anticipate the use of simple amplitude modulation of the TX signal, because demodulation of such a signal at the tag requires only a diode detector and filter, consistent with the low-cost and low-power requirements of a passive RFID tag. FIG. 3 illustrates a prior-art transmitter 300 including a modulator made of a switched attenuator 310 interposed in a transmit signal path 301 and a power amplifier 320, which amplifies the output from the switched attenuator. Thus, power amplifier 320 remains completely on during signal modulation. Such an arrangement has at least two disadvantages. First, switched attenuator 310 imposes an insertion loss that must be compensated for by increasing the gain (and power consumption) of power amplifier 320. Second, amplifier 320 is operated in a full-power condition at all times when transmitter 300 is turned on, wasting DC power. Since the consumption of DC power by amplifiers plays an important role in the overall power efficiency of an RFID reader, limiting the power consumption by amplifiers is critical in achieving a long battery life for a battery-powered and portable RFID reader.

In addition to power consumption, the manner of modulation also plays an important role in complying with regulatory requirements on sideband emissions. An RFID system must operate within one of a few narrow frequency bands specified by regulation agencies such as the Federal Communications Commission (FCC). Regulatory agencies place strict requirements on 'spurious' radiated power outside the specified frequency bands. It is well-known that perfectly-abrupt switching between high and low modulation states will result in a signal whose frequency spectrum is of the form of $(\sin[\omega-\omega_c]/[\omega-\omega_c])$, where $\omega_c$ corresponds to the center of a frequency band and is usually the nominal frequency for communications between a reader and a tag. The signal strength of such a frequency spectrum decreases very slowly as the frequency is shifted away from the nominal carrier frequency, so that significant spectral power will be found outside the specified frequency band. Thus, in order to meet the regulatory requirements, a reader using a switched transmit waveform must either reduce its output RF power, thus shortening the range in which a tag can be read, or reduce the modulation rate, thus limiting the number of tags that can be read in a certain time period. In either case, the utility and capability of the reader are reduced.

Figure 4:
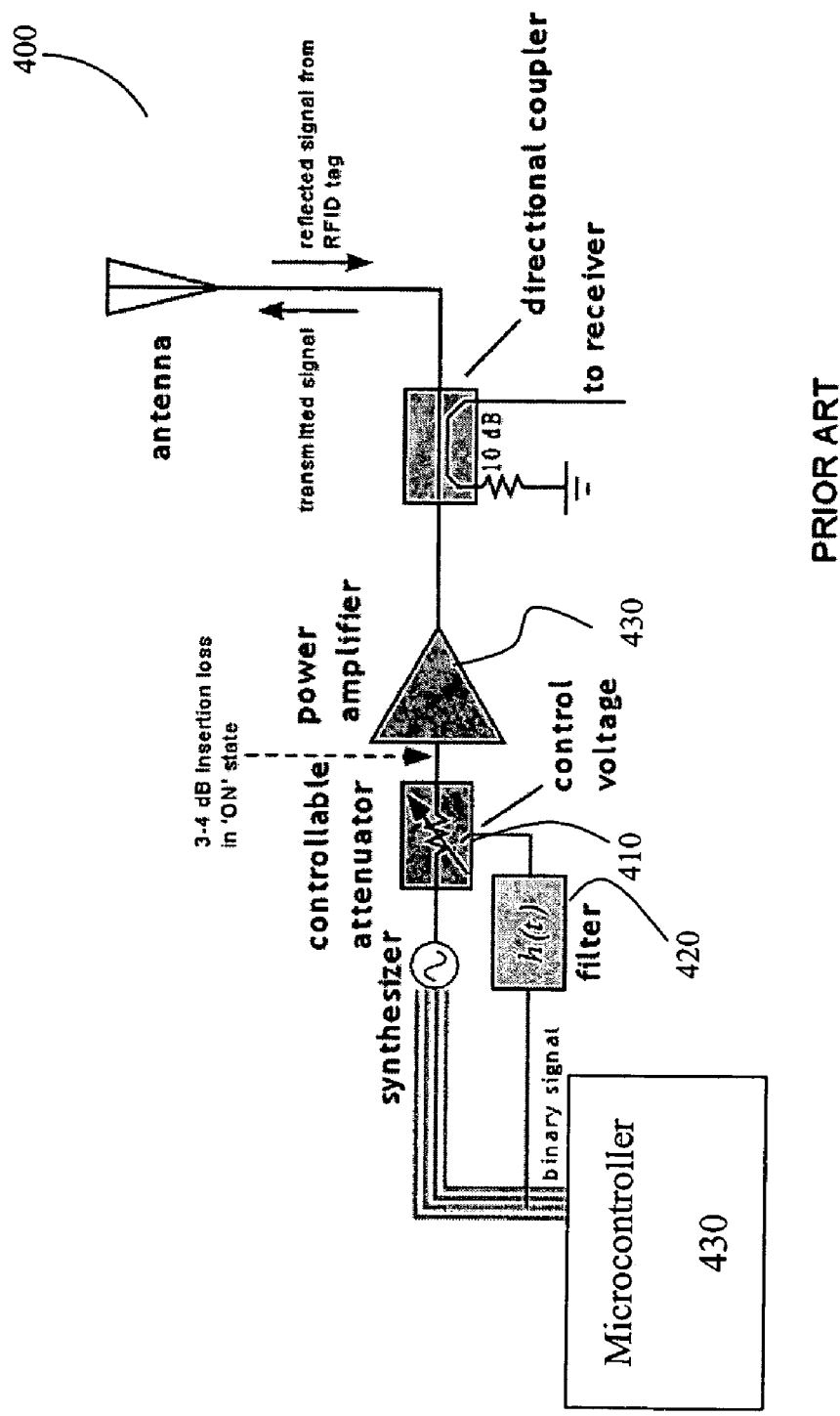
FIG. 4 is a block diagram of a prior art RF transmitter employing a controllable attenuator and filtered control voltage.

To solve the problem caused by abrupt switching between modulation states, a time-domain filter between successive amplitude states can be used to provide a smooth transition with reduced spectral width. FIG. 4 is a block diagram of another prior art transmitter 400 that includes a modulator made of a linear-response attenuator 410, a filter 420 coupled between the attenuator 410 and a control output of a controller 430, and a power amplifier 440 coupled to an output of attenuator 410. Thus, the attenuator 410 is controlled by a filtered control voltage and is capable of providing smoothed transition between modulation states. Transmitter 400 using the controllable attenuator 410 for modulation, however, is more expensive and has higher insertion losses than transmitter 300 in FIG. 3 where a simple modulating switch is used.

Figure 5:
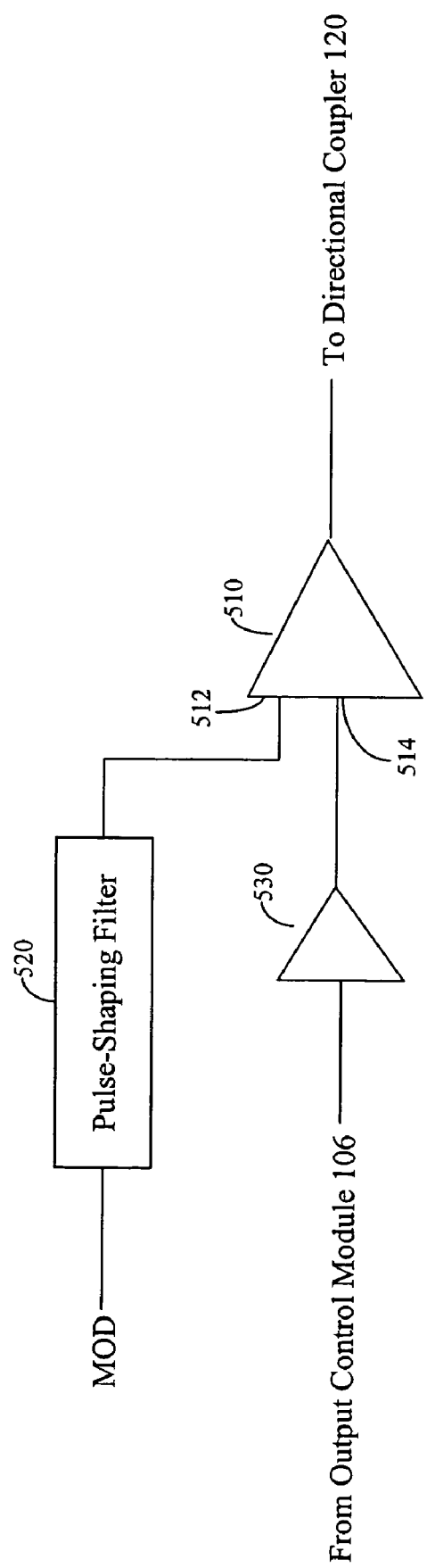
FIG. 5 is a block diagram of a modulator used in the RFID reader according to one embodiment of the present invention.

FIG. 5 is a block diagram of modulator 114 in reader 100 according to one embodiment of the present invention. As shown in FIG. 5, modulator 114 includes a linearized power amplifier (LPA) 510 placed in a transmit signal path between splitter 108 and directional coupler 120, and a pulse-shaping filter (PSF) 520 coupled between a bias control port 512 of LPA 510 and the MOD output of controller 164. Modulator 114 may further include an optional preamplifier 530 coupled between splitter 108 and a signal input 514 of LPA 510. Preamplifier 530 may be implemented using a conventional preamplifier.

During signal transmission, frequency synthesizer 104, LO buffer amplifier 106, and optional preamplifier 530 create an input signal of sufficient magnitude to drive LPA 510 about 1 dB into compression in its normal high-gain state in order to attain maximum output efficiency. As shown in FIG. 5, no RF switch or attenuator is placed in the transmit signal path, so no insertion loss penalty is incurred. Instead, the MOD signal, after being filtered by pulse-shaping filter 520, is directed to bias control port 512 of LPA 510. Therefore, less gain is required from the power amplifier, reducing the default power consumption by LPA 510.

Figure 6:
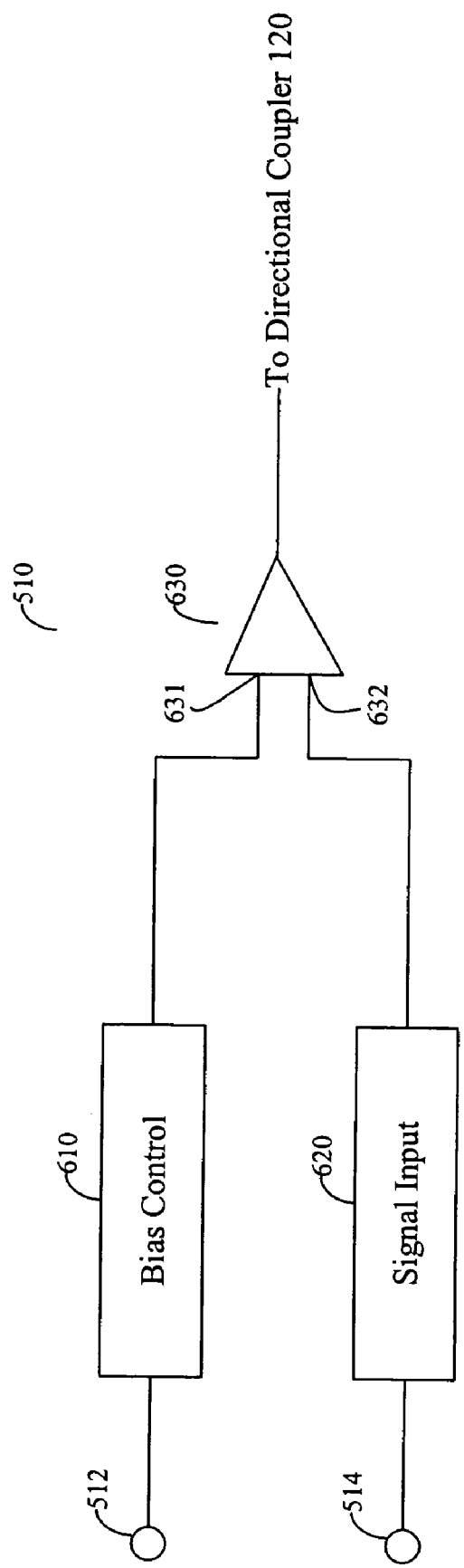
FIG. 6 is a block diagram of a linearized power amplifier in the modulator according to one embodiment of the present invention.
Figure 10:
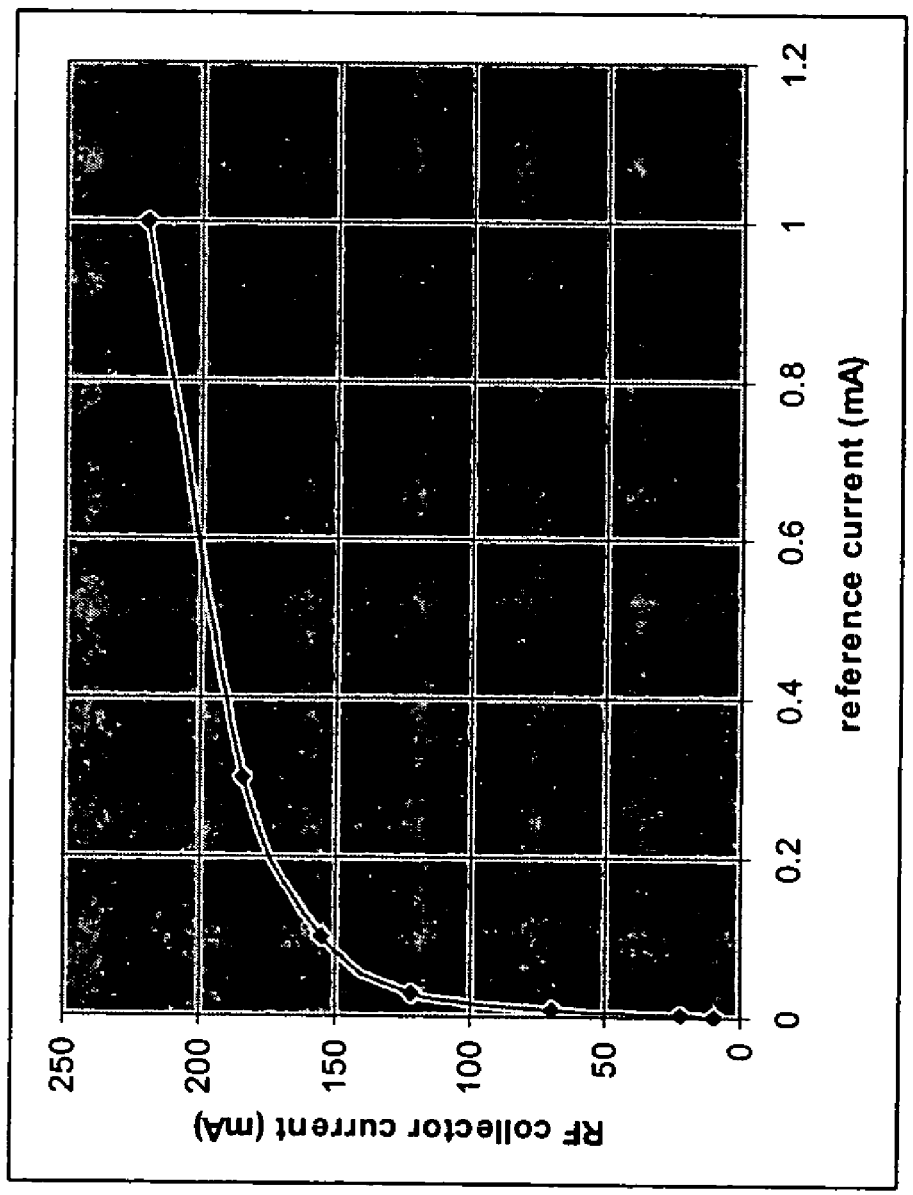
FIG. 10 is a chart of measured power transistor collector current vs. reference current in the power amplifier.

FIG. 6 is a block diagram of LPA 510 according to one embodiment of the present invention. As shown in FIG. 10, LPA 510 includes a bias control module 610, a signal input module 620, and a power amplifier 630. Bias control module is coupled between bias control port 512 of LPA 510 and a reference input 631 of power amplifier 630, and is configured to generate a reference signal in response to a filtered MOD signal from PSF 520. Signal input module 517 is coupled between signal input port 514 of LPA 510 and a signal input 632 of power amplifier 630 and is configured to generate an input signal to power amplifier 630 using the TX CW signal from output power control module 112 or optional preamplifier 530. Power amplifier 630 is configured to receive the reference signal and the input signal, to amplify and modulate the input signal according to the reference signal, and to output the TX signal. In one embodiment of the present invention, power amplifier 630 can be a conventional power amplifier.

Figure 7:
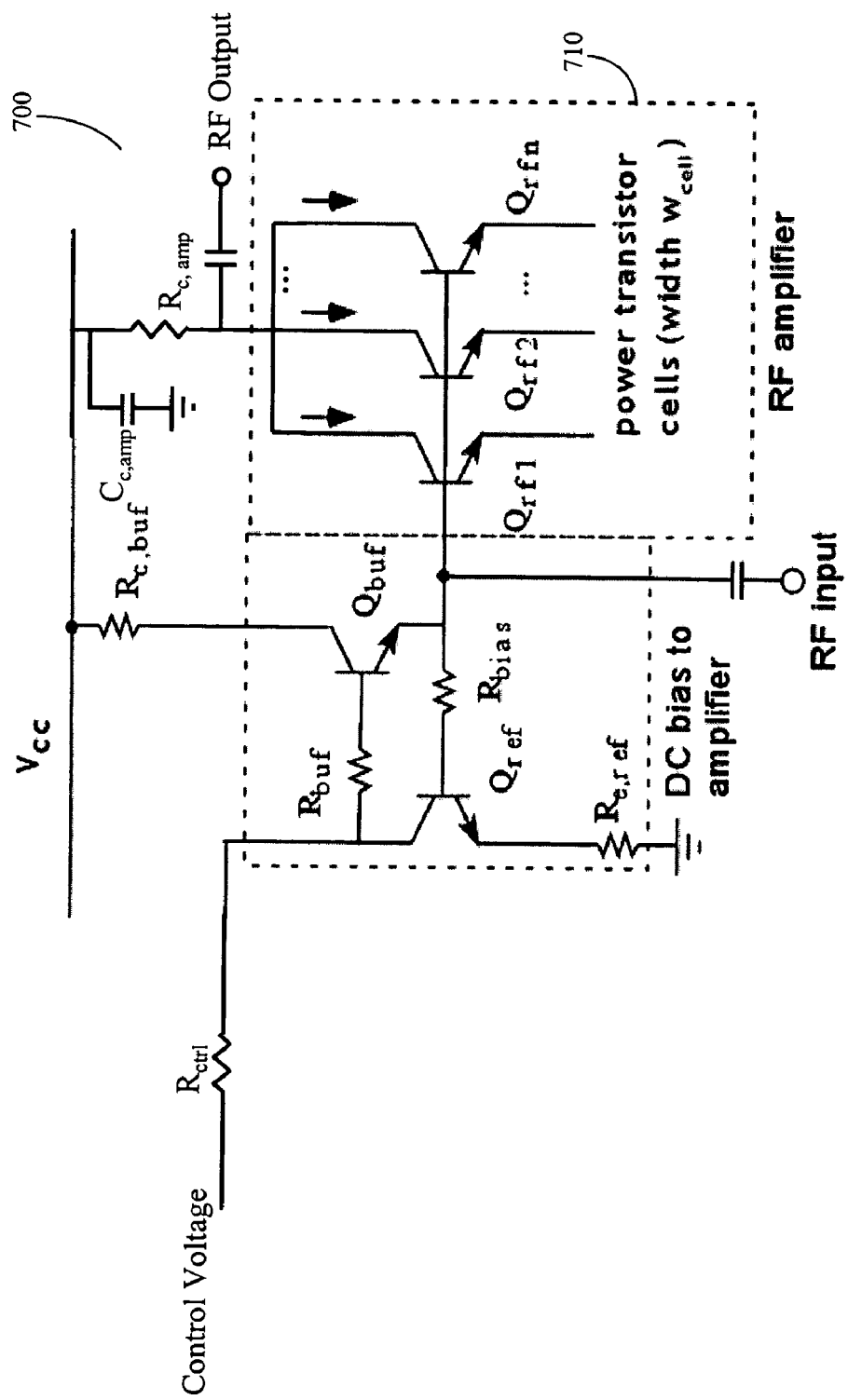
FIG. 7 is a circuit schematic of a power amplification circuit built with a conventional power amplifier.

Proper implementation of the bias control module 516 is important to achieve good spectral shaping of the TX signal. FIG. 7 is a schematic diagram of a power amplification circuit 700 built with a conventional power amplifier 710. As shown in FIG. 7, power amplifier 710 includes a reference transistor $Q_{ref}$, a reference resistor $R_{e,ref}$, an optional buffer transistor $Q_{buff}$ and an optional buffer resistor $R_{buff}$, a bias resistor $R_{bias}$, and a plurality of power transistor cells $Q_{rf1} \ldots Q_{rfn}$. Reference transistor $Q_{ref}$ has its emitter connected to ground via reference resistor $R_{e,ref}$, its collector connected to a control voltage source $V_{ctrl}$ via control resistor $R_{ctrl}$, which is a large-value precision resistor, and its base connected to the bases of power transistor cells $Q_{rf1} \ldots Q_{rfn}$ via bias resistor $R_{bias}$. Buffer transistor $Q_{buf}$, when provided, has its emitter connected to the bases of power transistors $Q_{rf1} \ldots Q_{rfn}$, its collector connected to a supply voltage $V_{CC}$ via a collector buffer resistor $R_{c,buf}$, and its base connected to $V_{ctrl}$ via buffer resistor $R_{buf}$ and control resistor $R_{ctrl}$. Power transistor cells $Q_{rf1} \ldots Q_{rfn}$ have their bases tied and connected to the base of reference transistor $Q_{ref}$ via bias resistor $R_{bias}$, and their collectors tied and connected to $V_{CC}$ through a resistor $R_{c,amp}$ and to the ground through resistor $R_{c,amp}$ and a capacitor $C_{c,amp}$. The emitter of each of the power transistors $Q_{rf1} \ldots Q_{rfn}$ is connected to ground via a resistor (not shown). An RF input is supplied to the bases of power transistor cells $Q_{rf1} \ldots Q_{rfn}$ and an RF output is drawn from the collectors of power transistor cells $Q_{rf1} \ldots Q_{rfn}$. Although FIG. 7 shows power amplification circuit 700 being implemented using bipolar transistors, a similar arrangement may also be employed when field-effect-transistors (FET) are used instead.

During the operation of power amplification circuit 700, a bias voltage at the base of reference transistor $Q_{ref}$ adjusts itself to provide a reference current flowing through control resistor $R_{cntrl}$ and reference transistor $Q_{ref}$. The reference current is required to amplify and modulate the RF input signal, The same bias voltage is provided to the bases of the power transistor cells $Q_{rf1} \ldots Q_{rfn}$, which are fabricated on the same integrated circuit and thus have the same characteristics and environmental conditions. A modulation bias current through each of the power transistor cells $Q_{rf1} \ldots Q_{rfn}$ thus results and is equal to the reference current multiplied by the ratio of the width of the power transistor cell to that of the reference transistor $Q_{ref}$, independent of variations in transistor characteristics or operating temperature or other environmental conditions. A modulated and amplified signal at the collector of each of the power transistor cells $Q_{rf1} \ldots Q_{rfn}$ results because of the bias currents. Buffer transistor $Q_{buf}$ and buffer resistor $R_{buf}$ function to improve the performance of the power amplification circuit 700.

Figure 8:
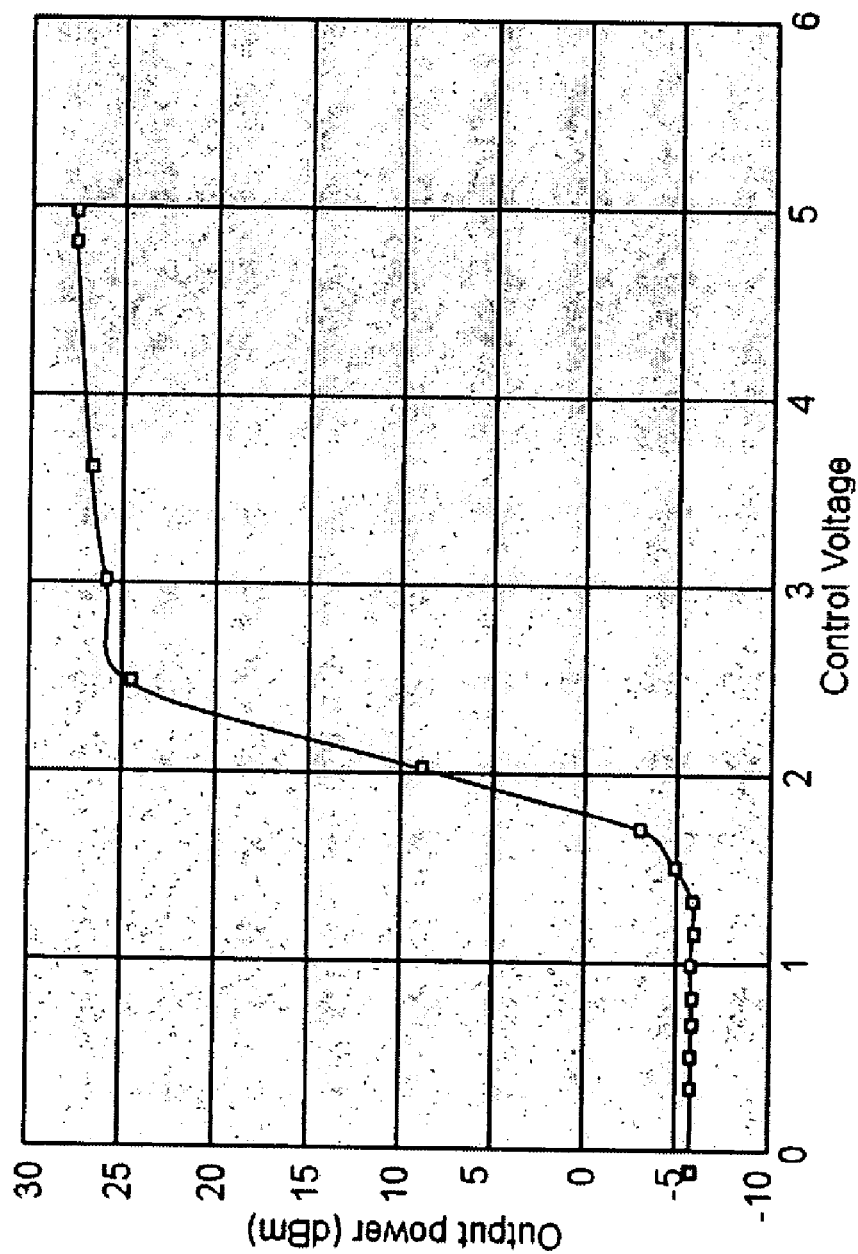
FIG. 8 is a chart of output power vs. reference input voltage for the power amplification circuit.
Figure 9:
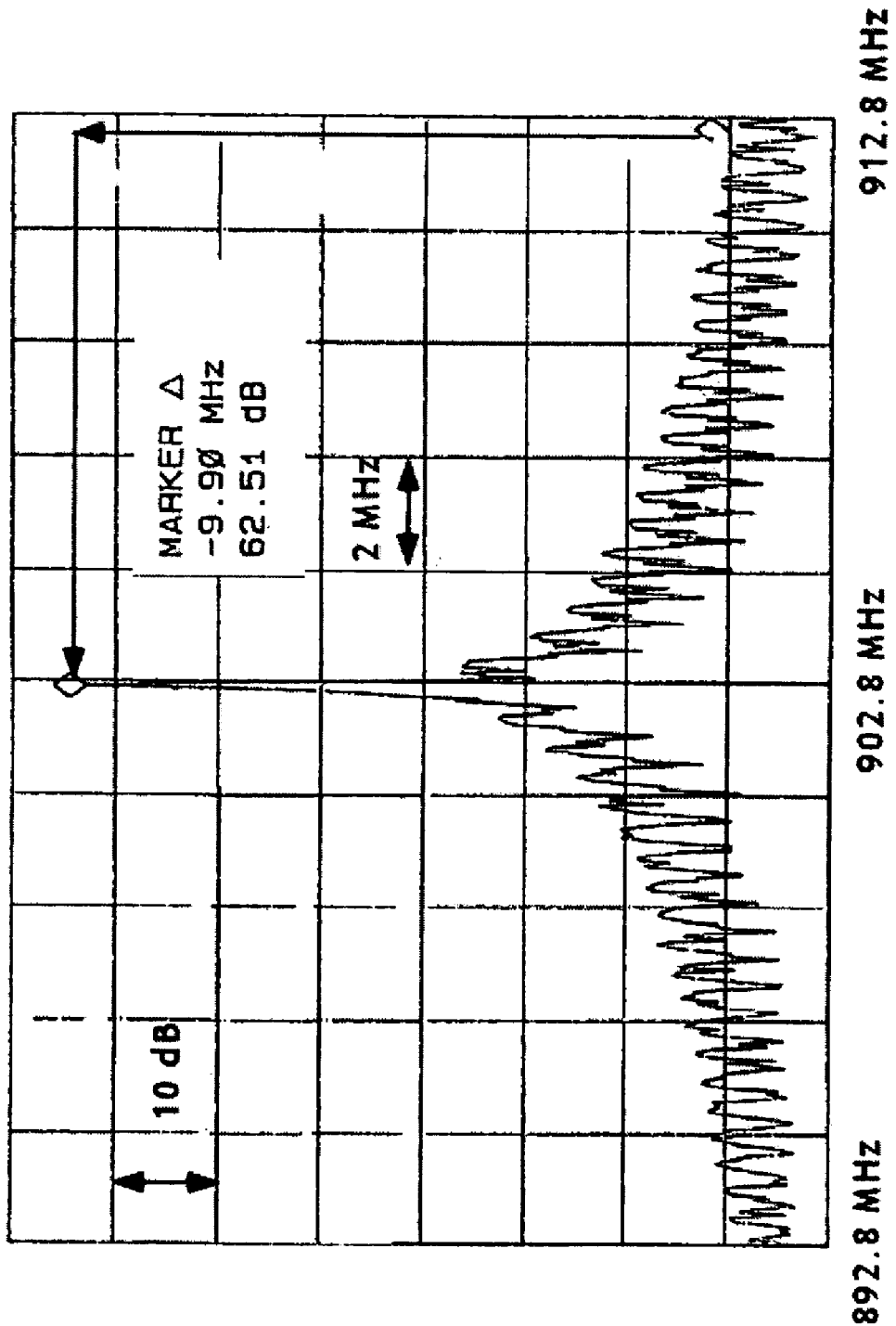
FIG. 9 is a chart showing output spectrum of the power amplification circuit.

Thus, an arrangement of the type shown in FIG. 7 may be used to convert the control voltage to a modulation bias current, by first converting the control voltage into a reference current using resistor $R_{cntrl}$ and then mirroring the reference current into a plurality of power transistors $Q_{rf1} \ldots Q_{rfn}$. The output power of power amplification circuit 700, however, is a highly nonlinear function of the control voltage, even when viewed logarithmically. As shown in FIG. 8, as the control voltage is decreased, the output power from power amplification circuit 700 is substantially invariant when the control voltage is larger than 2.5 V, and rapidly decreases to a small residual value for control voltages <1.8 V. Furthermore, as shown in FIG. 9, the output spectrum of power amplification circuit 700 has significant power at large displacements from the nominal carrier frequency even when a filtered control voltage is used. The output spectrum shown in FIG. 9 was obtained using input signals compliant with the Electronic Product Code (EPC) proposed standard for Class 1 RFID readers. The input signals are supplied to the bases of the power transistors $Q_{rf1} \ldots Q_{rfn}$.

Figure 11:
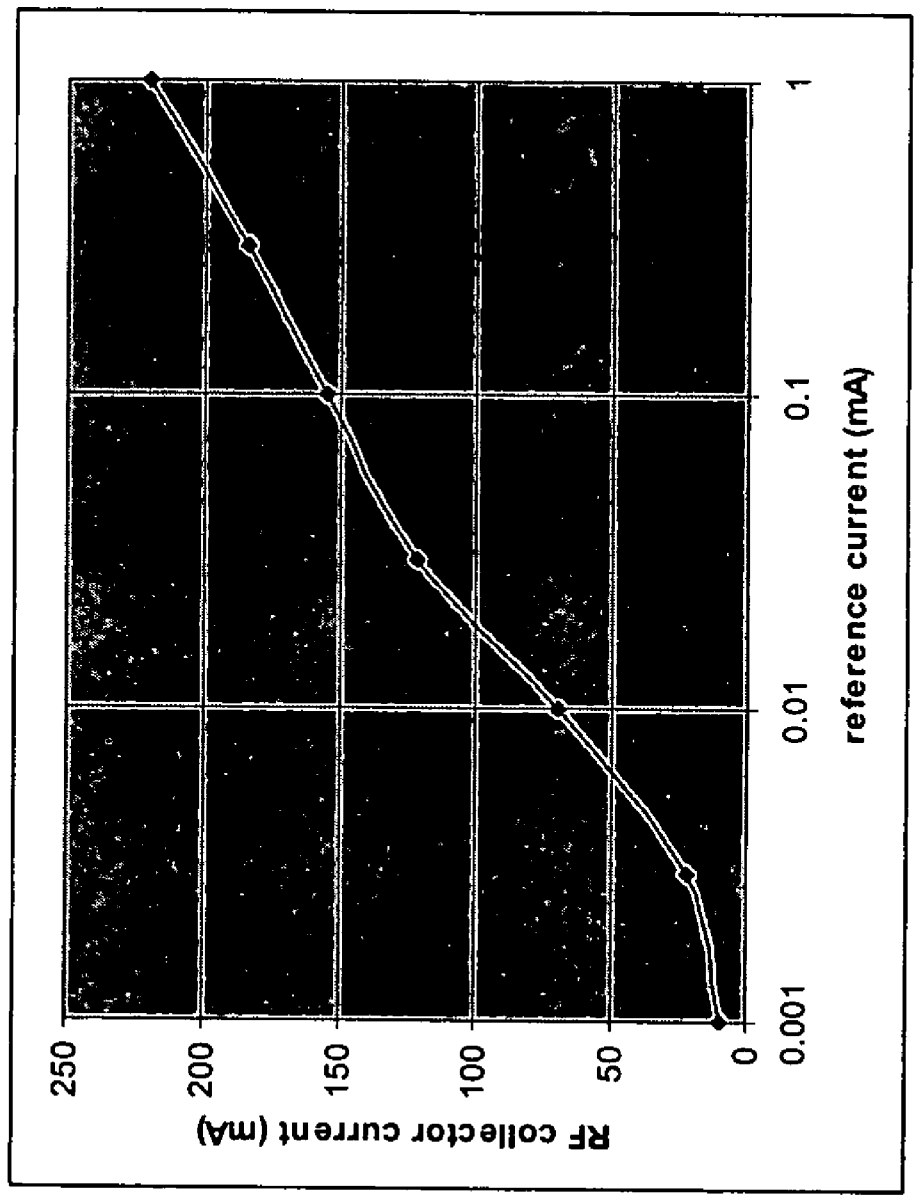
FIG. 11 is a chart of measured power transistor collector current vs. reference current in the power amplifier in logarithmic reference scale.

The undesirable spectral components shown in FIG. 8 from power amplification circuit 700 arise from the nature of a relationship between the reference current and the collector current in the power transistors $Q_{rf1} \ldots Q_{rfn}$ in power amplifier 710 when the power transistors are operating in a large-signal driven condition. FIG. 10 is a chart of the collector current in power transistors $Q_{rf1} \ldots Q_{rfn}$ vs. the reference current through reference transistor $Q_{ref}$ in power amplifier 710, and FIG. 11 is a chart of the collector current in the power transistors vs. the reference current in logarithmic scale, according to exemplary measurements. It is apparent that the collector current in the power transistors $Q_{rf1} \ldots Q_{rfn}$ is roughly linear in the logarithm of the reference current rather than in the value of the reference current. The strong inflection of (log x) at x=1 leads to a severe nonlinearity in an overall transfer function of power amplification circuit 700 and thus to spurious components in the output spectrum of power amplification circuit 700. A reference current that ramps logarithmically with time or even linearly with time should help remedy the problem because such a reference current will cause the RF collector current and thus the output power from the power amplifier to ramp linearly or approximately linearly with time.

Figure 12:
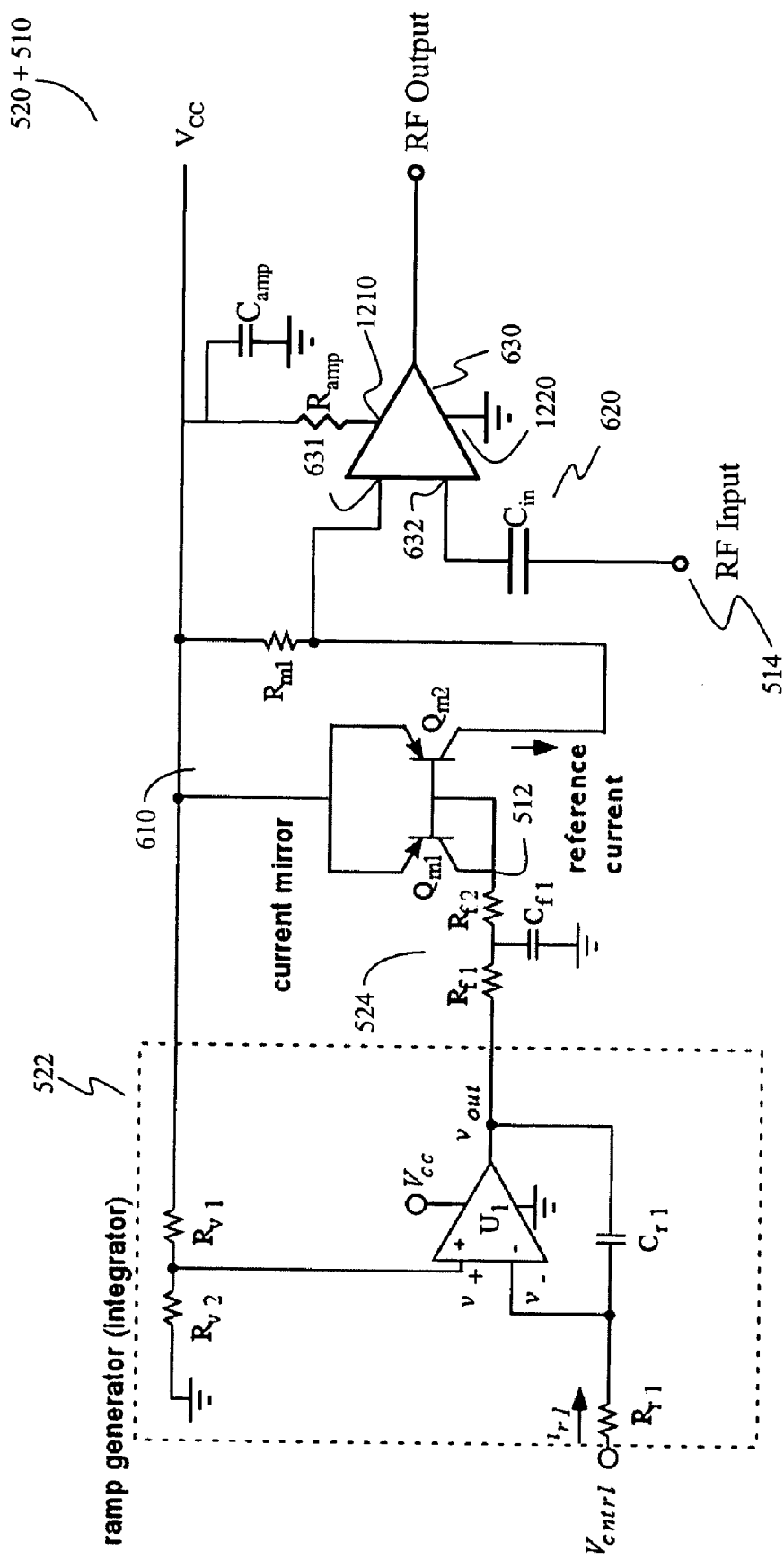
FIG. 12 is a circuit schematic of a linearized power amplifier modulator according to one embodiment of the present invention.

In contrast to prior art modulators, FIG. 12 illustrates schematically LPA 510 and PSF 520 in modulator 114 according to one embodiment of the present invention. As shown in FIG. 12, PSF 520 includes a ramp generator 522 and a low-pass filter 524. Ramp generator 522 includes an operational amplifier (op-amp) $U_1$ coupled between a supply voltage $V_{CC}$ and ground, a first resistor $R_{v1}$ coupled between a first input $v_+$ of op-amp $U_1$ and $V_{cc}$, a second resistor $R_{v2}$ coupled between the first input $v_+$ of op-amp $U_1$ and ground, a third resistor $R_{r1}$ coupled between the MOD output of controller 164 and a second input $v_-$ of op-amp $U_1$, and a capacitor $c_{r1}$ coupled between the second input $v_-$ and an output $v_{out}$ of the op-amp $U_1$. Low pass filter 524 is an RC low-pass filter coupled between output $v_{out}$ of op-amp $U_1$ and bias input 512 of LPA 510 and including two serially connected resistors $R_{f1}$ and $R_{f2}$, and capacitor $C_{f1}$.

In one embodiment of the present invention, op-amp $U_1$ has a large voltage gain and a slew rate very fast compared to a desired ramp time (e.g., 1.5 microsecond) for the modulated TX signal. As a consequence, $U_1$ adjusts its output voltage $v_o$ to ensure that $v_- \approx v_+$. Since $v_+$ is set by resistors $R_{r1}$, $R_{r2}$, and the supply voltage $V_{cc}$, $v_-$ is effectively held to a constant value. Thus, a current $i_{r1}$ flowing through resistor $R_{r1}$ is fixed for any given value of a control voltage $V_{cntrl}$ from the MOD output of controller 164. This fixed current charges the capacitor $C_{r1}$ at a fixed rate $$\frac{d(v_0 - v_-)}{dt} = -\frac{(V_{cntrl} - v_-)}{R_{r1}C_{r1}}$$

until the output voltage or ramp voltage $v_o$ reaches a rail value and an effective voltage gain of the op-amp $U_1$ falls. Thus a step-function input $V_{cntrl}(t)$ leads to a linear ramp output $v_o$ whose slope depends on the step value in the step-function input $V_{cntrl}(t)$ and the values of $R_{r1}$ and $C_{r1}$. The ramp time, i.e., the time it takes for the ramp output $v_o$ to reach the rail value, can be approximately computed as:

$$t_{ramp} \approx \frac{(V_{rail})}{(V_{cntrl} - v_-)} R_{r1} C_{r1}$$

The linear ramp is then filtered by the low-pass filter 524 to smooth a possible sharp transition in the ramp output $v_o$ caused by any change in the value of $V_{cntrl}$. The two resistors $R_{f1}$ and $R_{f2}$ in low-pass filter 522 are preferably of a same or similar value to ensure that the charging of capacitor $C_{f1}$, and therefore the shape of the output voltage characteristic, is symmetric with respect to positive-going and negative-going ramps. An overall time constant $t_{sm} \approx R_{f1} C_{f1}$ is chosen so that the sum of the ramp time and filter time equals the smallest pulse time in the MOD signal:

$$t_{ramp} + t_{sm} \approx t_{pulse,min}$$

The smoothed ramp output is delivered to bias input 512 of LPA 510. Still referring to FIG. 12, LPA 510 includes bias control module 516, signal input module 517, and power amplifier 630, which, in this embodiment, is a conventional power amplifier similar in configuration to power amplifier 710. Bias control module 516 includes a first transistor $Q_{m1}$ configured as a diode and coupled between bias input 512 and $V_{cc}$, and a second transistor $Q_{m2}$ having identical or similar characteristics as transistor $Q_{m1}$ and coupled with transistor $Q_{m1}$ in a current mirror configuration. Bias control module 516 further includes a resistor $R_{m1}$ coupled between the collector of transistor $Q_{m2}$ and $V_{CC}$ and between reference input 631 of power amplifier 630 and $V_{CC}$. Signal input module 517 includes a capacitor $C_{in}$ coupled between signal input 514 of LPA 510 and signal input 632 of power amplifier 630. Power amplifier 630 further includes a ground terminal coupled to the ground and bias terminal coupled to $V_{CC}$ via a resister $R_{amp}$ and to ground via resistor $R_{amp}$ and capacitor $C_{amp}$.

Although FIG. 12 shows LPA 510 being implemented using bipolar transistors. A similar arrangement may also be employed when field-effect-transistors (FET) are used instead or in combination with bipolar transistors. For example, transistors $Q_{m1}$ and $Q_{m2}$ may be replaced by two identical or similarly configured FETs such that the gates of the FETs correspond to the bases of transistors $Q_{m1}$ and $Q_{m2}$, respectively, and the sources of the FETs correspond to the emitters of transistors $Q_{m1}$ and $Q_{m2}$, respectively, and the drains of the FETs correspond to the collectors of transistors $Q_{m1}$ and $Q_{m2}$, respectively.

During the operation of LPA 510, the difference between $V_{CC}$ and filtered ramp output voltage from PSF 520 at bias input 512 causes a current to flow through transistor $Q_{m1}$, and this current is mirrored by transistor $Q_{m2}$ to produce a reference current I(ref) flowing into power amplifier 630 through reference input 631. The reference current input causes power amplifier 630 to modulate and amplify the TX CW signal sent to power amplifier 630 through capacitor $C_{in}$ and produces the modulated and amplified TX CW signal as the TX signal. Resistor $R_{m1}$ sets a nominal modulation depth so that the current through $R_{m1}$ sets a lower bound for the reference current when transistor $Q_{m2}$ is substantially off.

Table 1 illustrates examples for the values of some of the components in LPA 510 and PSF 520, according to one embodiment of the present invention. All of the components in Table 1 are commercial components available at modest cost.

TABLE 1

| Component name | Value | units |
|---|---|---|
| $R_{v1}$ | 10 | KΩ |
| $R_{v2}$ | 10 | KΩ |
| $R_{r1}$ | 6.8 | KΩ |
| $C_{r1}$ | 100 | pF |
| $U_1$ | LM6142B | (NA) |
| $R_{f1}$ | 430 | Ω |
| $R_{f2}$ | 430 | Ω |

TABLE 1-continued

| Component name | Value | units |
|---|---|---|
| $C_{f1}$ | 680 | pF |
| $Q_{m1}$, $Q_{m2}$ | 2N3906 | (NA) |
| $R_{m1}$ | 1250 | KΩ |
| Power Amplifier 630 | ECP200D or ECP052D | |

Figure 13:
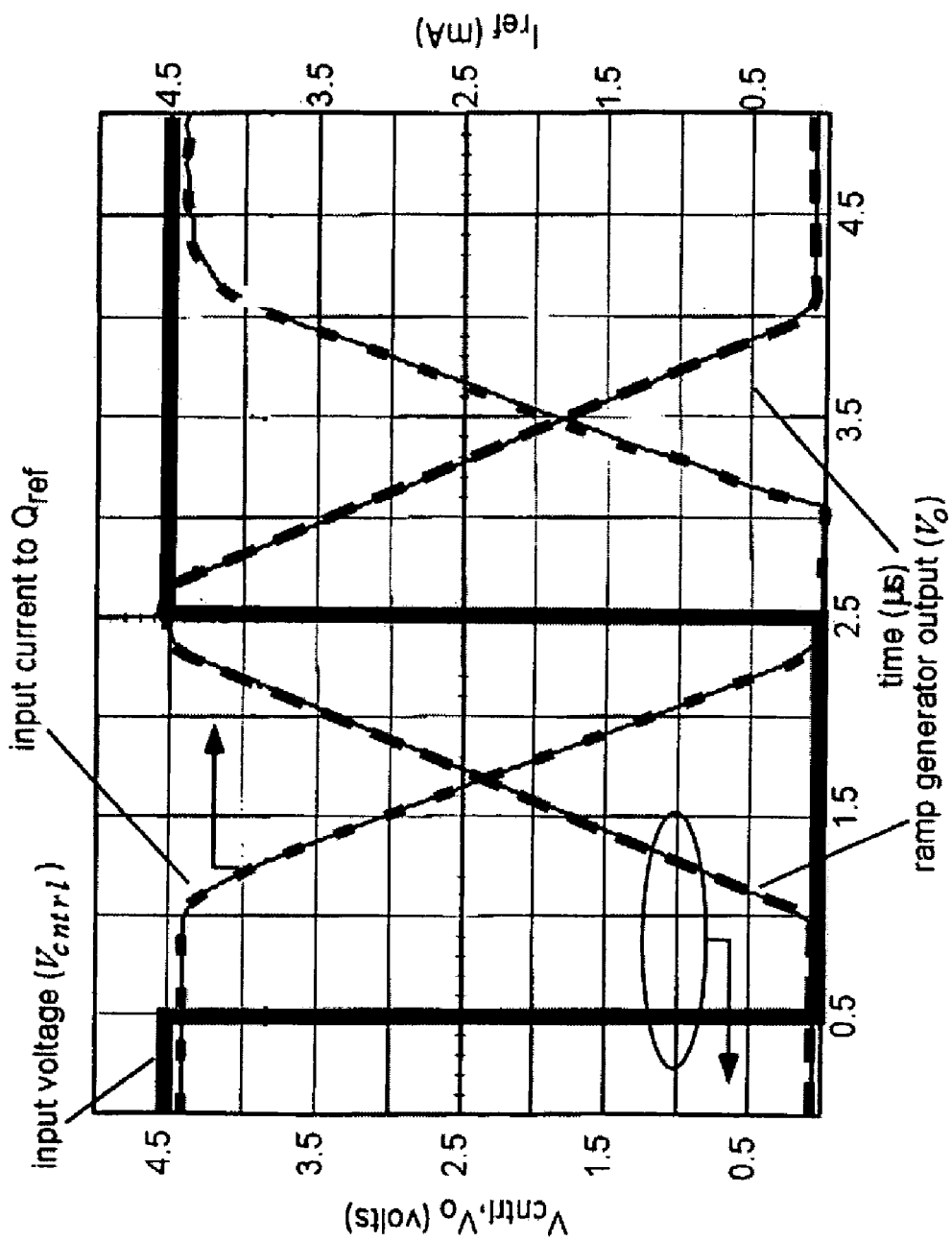
FIG. 13 is a chart of a control voltage and currents for the linearized power amplifier modulator according to one embodiment of the present invention.

FIG. 13 are simulated plots of the control voltage $V_{cntrl}$ from the MOD output of controller 164, the output voltage $v_o$ from ramp generator 522, and the reference current I(ref) flowing through bias transistor $Q_{ref}$. FIG. 13 illustrates the behavior of the ramp voltage $v_o$ and the reference current I(ref) for a step function input of $V_{cntrl}$ with a pulse width of 2 µs. As shown in FIG. 13, ramp generator 522 introduces a small delay and ramps each step transition over a ramp time of approximately 1.5 µs. The reference current I(ref) is also delayed and has a substantially linear ramp corresponding to each step transition in $V_{cntrl}$.

Figure 14:
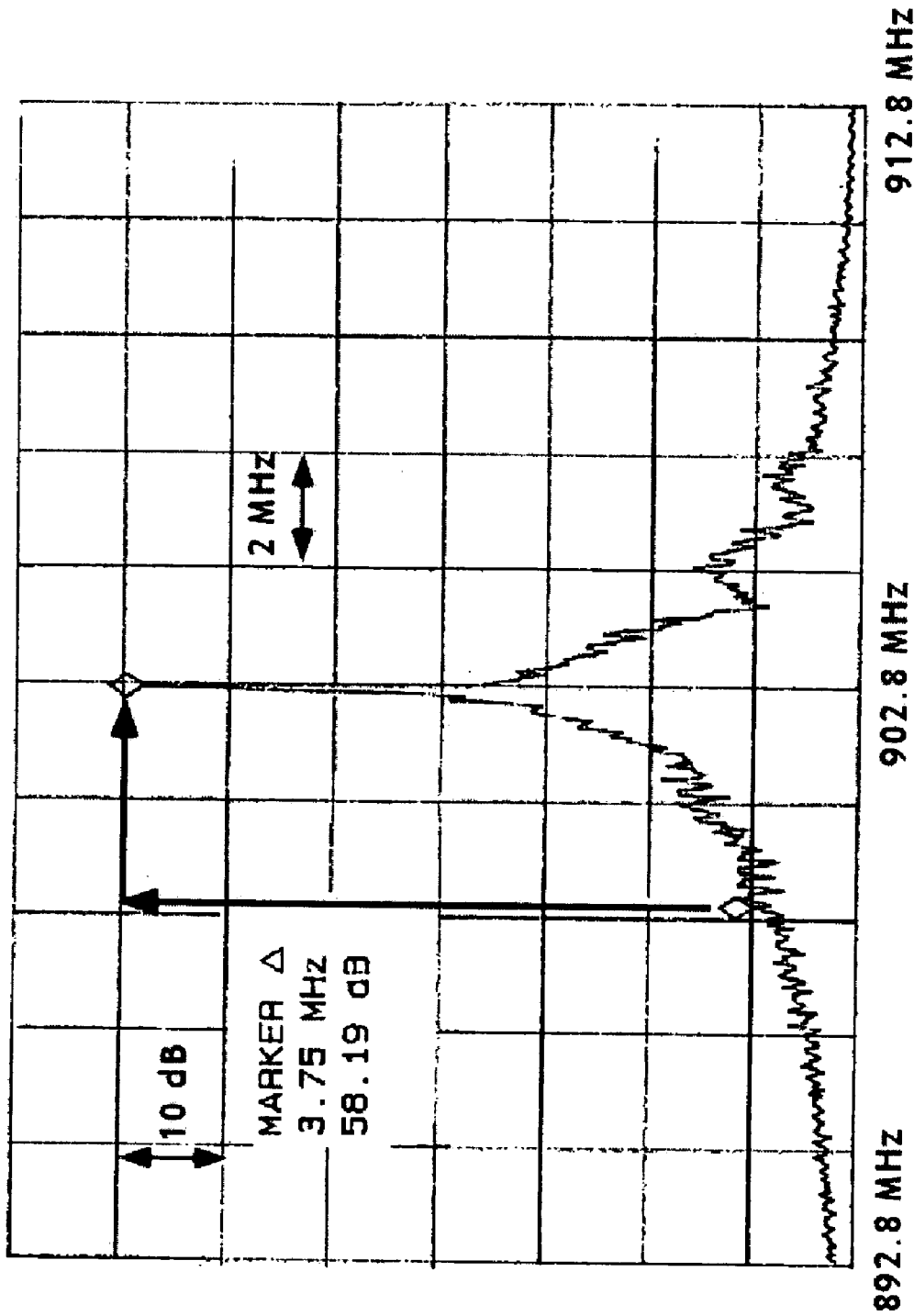
FIG. 14 is a chart showing an exemplary output spectrum for the linearized power amplifier modulator according to one embodiment of the present invention.

FIG. 14 shows a measured output spectrum from LPA 510 according to one embodiment of the present invention. Compared with FIG. 9, the power spectral density away from the nominal frequency in FIG. 14 is reduced by at least 6 dB, and shows less dependency on frequency. Such reductions in sideband power are of great significance in meeting regulatory requirements imposed to minimize interference between radios operating in nearby bands. Thus, the embodiments of the present invention provide significantly reduced spurious radiation power, and consume less DC power due to both a reduction in the required RF gain of the power amplifier 630 and a reduction in the power consumption by the power amplifier 630 at low bias currents. These benefits are robust with respect to variations in supply voltage and temperature over normal operating requirements for commercial radio gear, and are obtained with minimal increase in manufacturing cost.

Referring again to FIG. 1A, the output of modulator 114 is directed to one or more of the plurality of antenna 124 for transmission to the tag(s) by the directional coupler 120 and antenna select module 122. RF signals from the tags are also received by the antenna 124 and are directed by directional coupler 122 to RX chain 130. A conventional directional coupler may be used as directional coupler 120.

Figures 15A, 15B:
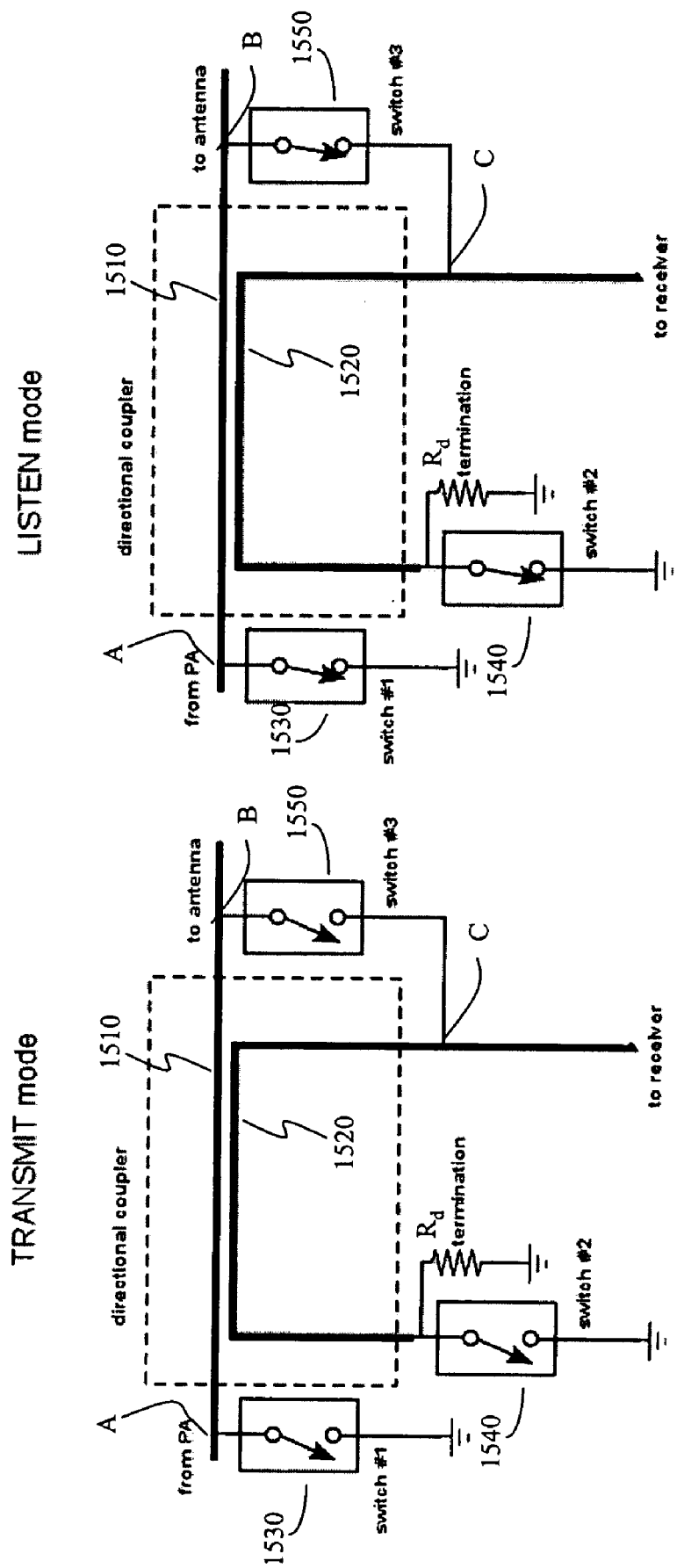
FIGS. 15A and 15B are circuit schematic of a directional coupler in the RFID reader according to one embodiment of the present invention.

In some cases, such as according to proposed ETSI Standard EN302 208, RFID readers may be required to operate in a LISTEN mode prior to transmitting the transmit signal. In the LISTEN mode, the RFID reader should not radiate significant RF power and should have good sensitivity to detect other similar devices operating on a channel before interrogation. Thus, in an alternative embodiment of the present invention, directional coupler 120 includes shunt switches to prevent reader 100 from transmitting signals in the LISTEN mode. As shown in FIGS. 15A and 15B, directional coupler 120 includes a main line 1510 extending between ports A and B of directional coupler 120, and a secondary line extending between a port C of directional coupler 120 and one terminal of a termination resistor $R_d$, which has its other terminal connected to ground. Port A is connected to modulator 124, port B is connected to antenna select module 122, and port C is connected to RX chain 130. Main line 1510 and secondary line 1520 may be part of a conventional quarter-wavelength, coaxial directional coupler. In one embodiment of the present invention, main line 1510 and secondary line 1520 each extends over a length of one-quarter wavelength corresponding to the center frequency.

Still referring to FIGS. 15A and 15B, directional coupler 120 further includes shunt switching elements (switches) 1530, 1540 and 1550, which may be realized using PIN diodes, FET switches, or other conventional means. Switch 1530 is coupled between port A and ground, switch 1540 is coupled between the two terminals of resister $R_d$, and switch 1550 is coupled between port B and port C of directional coupler 120.

In the LISTEN mode of operation, switches 1530, 1540, and 1550 are actuated, as shown in FIG. 15B, and directional coupler 120 becomes in one aspect a quarter-wave transformer and in another aspect a direct path from antenna 124 to RX chain 130. As a quarter-wave transformer, directional coupler 120 with the switches actuated transforms a short created by switch 1530 into an open circuit one-quarter wavelength down the main line 1510 at port B and another short created by switch 1540 into an open circuit one-quarter wavelength down the secondary line 1520 at port C, so that the TX signal does not reach the antenna and directional coupler 120 draws no power from a received signal. The direct path to the RX chain 130 is provided by the actuated switch 1550 so that in the LISTEN mode, the received signal suffers only a modest loss (typically <1 dB) in traversing directional coupler 120, which is much smaller compared to a typical 10 dB or more loss that would have been encountered using a conventional directional coupler.

When reader 100 is transmitting signals to or receiving signals from tags, switches 1530, 1540, and 1560 are not actuated, as shown in FIG. 15A, so that directional coupler 120 functions as a conventional directional coupler, which separates signals based on the direction of signal propagation. In contrast to a conventional LISTEN mode architecture wherein a switch is inserted in the signal path and causes series insertion loss (as much as 0.5 dB) to a received signal, switches 1530, 1540, and 1550 in directional coupler 120 are not placed in the signal path. Therefore, they cause almost no loss to either the transmit or received signals.

Figure 16A:
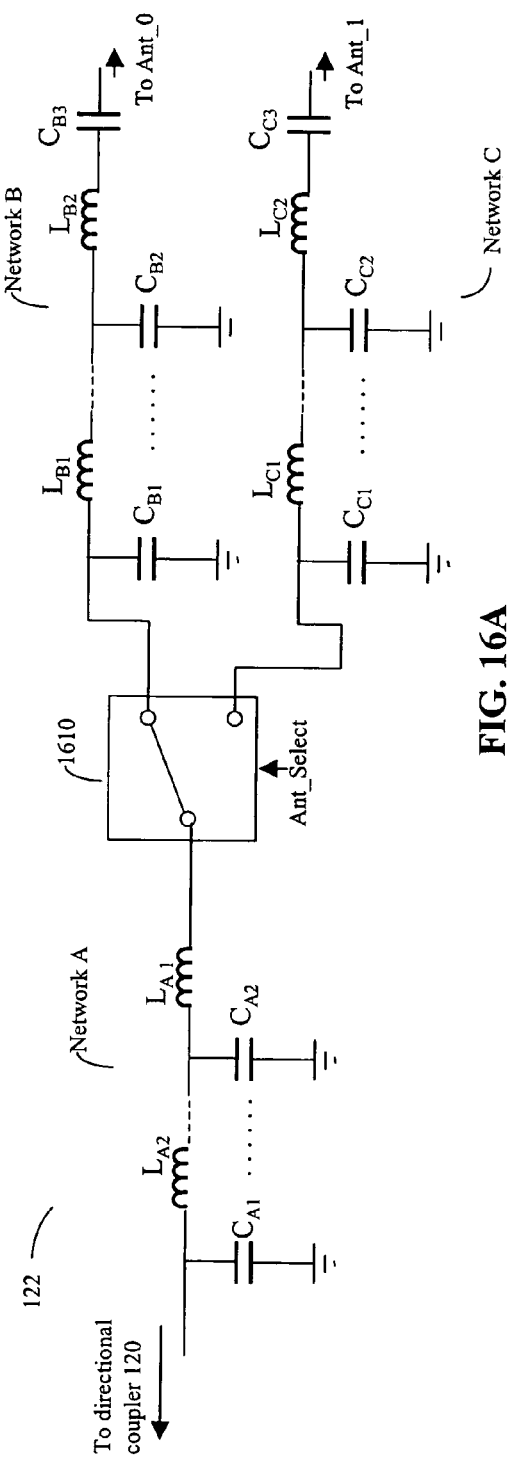
FIGS. 16A and 16B are circuit schematics of an antenna select module in the RFID reader according to one embodiment of the present invention.

Directional coupler 120 is connected through port B to an antenna 124 for transmitting and receiving signals. Antenna 124 may be included in reader 100 and built in a single housing with the rest of the components of reader 100. Alternatively, antenna 124 is external to reader 100 and can be manually connected with reader 100. Referring again to FIG. 1A, reader 100 allows the use of more than one antenna 124 by including antenna select module 122, which is configured to select one antenna for transmitting the TX signal or receiving the RF signal from the tag. In one embodiment of the present invention, antenna select module 122 is configured to select one of two antenna, Ant_0 and Ant_1, and includes a switch element whose parasitic components are integrated into a low-pass filter prototype structure. As shown in FIG. 16A, in one embodiment of the present invention, antenna select module 122 includes a first filter network (network A), a second filter network (network B), a third filter network (network C), and a switch element 1610 coupled between network A and networks B and C.

Network A includes an LC series having at least one inductor, such as inductors $L_{A1}$ and $L_{A2}$, and at least one capacitor, such as capacitors $C_{A1}$ and $C_{A2}$, network B includes a LC series having at least one inductor, such as inductors $L_{B1}$ and $L_{B2}$, and at least one capacitor, such as capacitors $C_{B1}$, $C_{B2}$, and $C_{B3}$, and network C includes a LC series having at least one inductor, such as inductors $L_{C1}$ and $L_{C2}$, and at least one capacitor, such as capacitors $C_{C1}$, $C_{C2}$, and $C_{C3}$. Networks A, B and C may also include resisters at various places in the network. Networks B and C are substantially matched such that each component in network B matches a corresponding component in network C. In the embodiment where both network B and network C includes LC series, as shown in FIG. 16A, the values of the inductors and capacitors in network B are selected to be substantially equal to corresponding ones of the values of the inductors and capacitors in network C, i.e., $L_{B1}=L_{C1}$, $L_{B2}=L_{C2}$, $C_{B1}=C_{C1}$, $C_{B2}=C_{C2}$, and $C_{B3}=C_{C3}$.

Figure 16B:
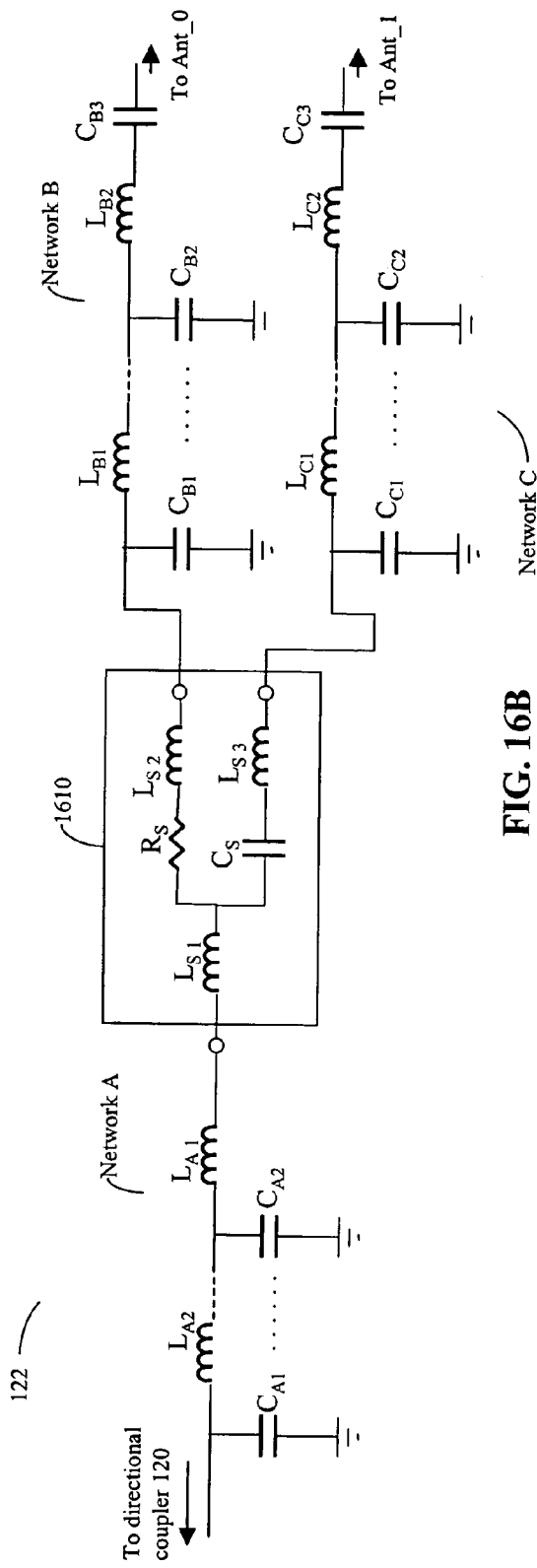
Figure 16C:
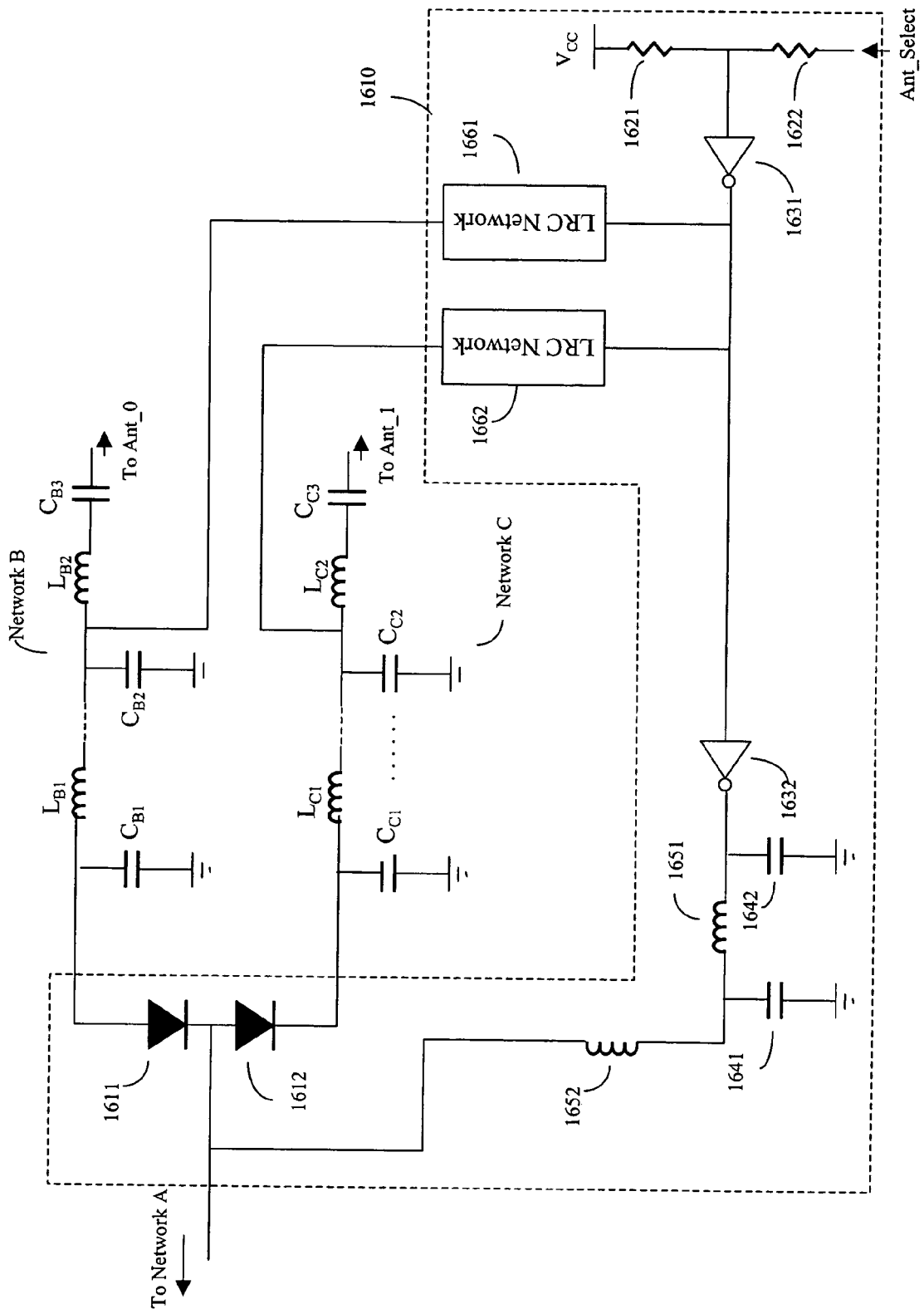
FIG. 16C is a circuit schematic of a switch element in the antenna select module according to one embodiment of the present invention.

Switch element 1610 may be a conventional switching device configured to connect either network B or network C to network A according to the Ant_Select signal from controller 164. FIG. 16C illustrates components of switch element 1610 according to one embodiment of the present invention. As shown in FIG. 16C, switch element 1610 includes a pair of diodes 1611 and 1612 serially connected with each other between inputs of networks B and C, resisters 1621 and 1622 serially connected with each other between $V_{CC}$ and the Ant_Select output of controller 164, a pair of inverters 1631 and 1632 serially connected with each other between the Ant_Select output of controller 164 and a low-pass filter structure comprising capacitors 1641 and 1642 and inductors 1651 and 1652, which is coupled between the inverters 1631 and 1632 and a circuit node between diodes 1611 and 1612, and a pair of LRC filter networks 1661 and 1662 each coupled between a circuit node between the inverters 1631 and 1632 and a circuit node in a respective one of networks B and C. During operation, the Ant_Select signal is converted by resisters 1621 and 1622 into a voltage signal, which is inverted first by inverter 1631 and again by inverter 1632. The output of inverter 1632 is supplied to the circuit node between diodes 1611 and 1612 through the low-pass filter structure made of capacitors 1641 and 1642 and inductors 1651 and 1652. The output of inverter 1631 is supplied to the other terminals of diodes 1611 and 1612 through LRC networks 1661 and 1662, respectively. Thus, depending on the Ant_signal, either diode 1671 or diode 1672 conducts, connecting network B or network C to network A.

Figure 16D:
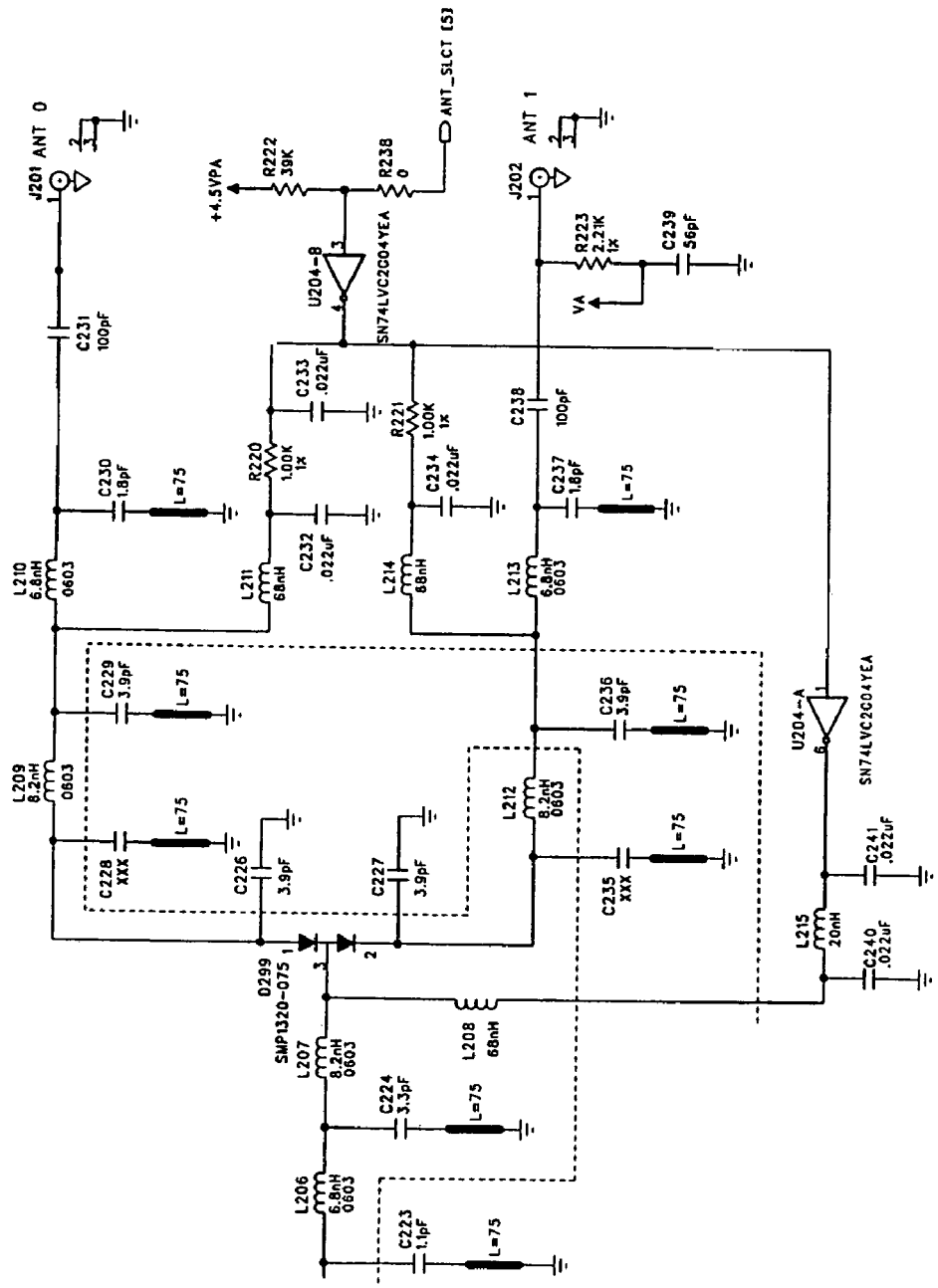
FIG. 16D is a circuit schematic of the antenna select module showing component values according to one embodiment of the present invention.
Figure 16E:
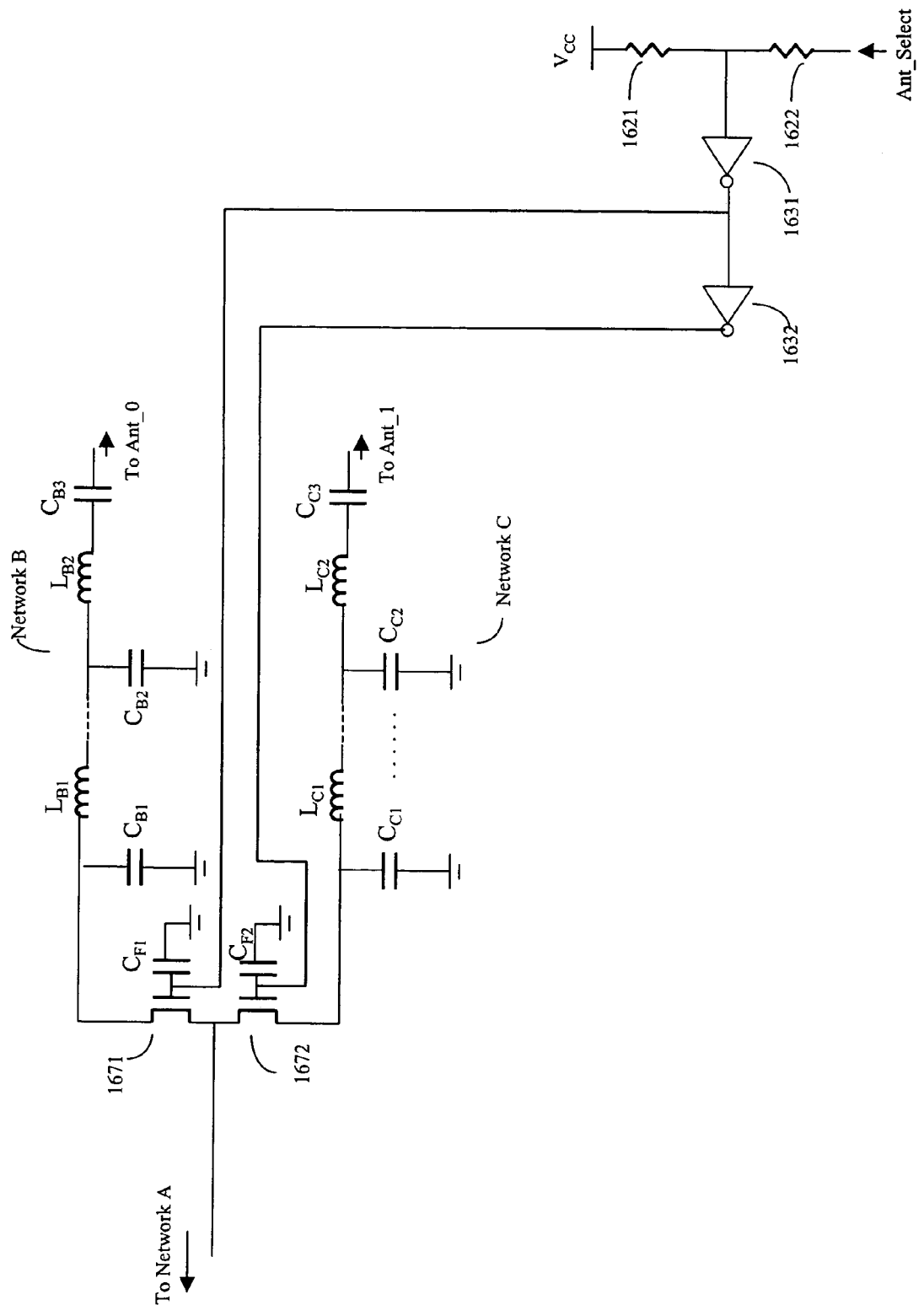
FIG. 16E is a circuit schematic of a switch element in the antenna select module according to an alternative embodiment of the present invention.

FIG. 16E illustrates another implementation of switch element 1610 according to an alternative embodiment of the present invention. As shown in FIG. 16E, instead of diodes 1611 and 1612, field effect transistors (FETs) 1671 and 1672 are used to switch between network B and network C. The source/drain diffusions of FET 1671 are connected to respective ones of the output of network A and the input of network B. The source/drain diffusions of FET 1672 are connected to respective ones of the input of network C and the output of network A. The gates of FETs 1671 and 1672 are connected to ground via respective ones of capacitors $C_{F1}$ and $C_{F2}$ and to respective ones of the outputs of inverters 1632 and 1631 so that either FET 1671 or FET 1672 conducts depending on the Ant_signal.

FIGS. 16C and 16E only shows two examples of implementing switch element 1610, other implementations of switch element 1610 known in the art may also be used. However implemented, switch element contributes parasitic components that need to be accounted for in order to obtain optimal signal quality. For an example, when switch element 1610 is switched to connect network B with network A, i.e., Ant_0 is selected, as shown in FIGS. 16A and 16B, components in switch element 1610 such as diodes 1611 and 1612 or FETs 1671 and 1672 may contribute parasitic components such that switch element 1610 is analogous to a combination of parasitic components including a resistor $R_S$, a capacitor $C_S$, and inductors $L_{S1}$, $L_{S2}$, and $L_{S3}$. Inductor $L_{S1}$, resistor $R_S$, and inductor $L_{S2}$ are connected in series with each other between network A and network B. Capacitor $C_S$ and Inductor $L_{S1}$ are connected in series with each other and with inductor $L_{S1}$, in parallel with resistor $R_S$ and inductor $L_{S2}$, and between network A and network C. Switch element may also include other parasitic components not shown in FIG. 16B.

To optimize the transfer function of the low-pass filter associated with antenna select module 122 between directional coupler 120 and a selected antenna, the parasitic components of switch element 1610 are characterized to determine their values and these values are accounted for when choosing the values of the inductors, capacitors and/or resistors in networks A, B, and C such that networks A, B, and C and parasitic components of switch element 1610 are integrated into one low-pass filter prototype structure. Examples of low-pass filter prototype structures include the well known Chebyshev or Bessel low-pass filter prototype structures or the like. Conventional circuit simulation programs or empirical methods can be employed in the determination of the component values in networks A, B, and C. For example, when network B is connected to network A by the switch element 1610, the value of inductor $L_{A1}$ may be adjusted to account for parasitic inductances $L_{S1}$ and $L_{S2}$ and parasitic resistance $R_S$, and the values of capacitor $C_{B1}$ and $C_{C1}$ may be adjusted to account for parasitic capacitance $C_S$, parasitic inductance $L_{S3}$, and effects of network C. FIG. 16D illustrates a circuit schematic of antenna select module 122 where exemplary values of various components are shown according to one embodiment of the present invention.

Although FIGS. 16A to 16D show that networks A, B and C include LC or LRC series, other types of filter networks known in the art may also be used as networks A, B, and C. Whichever type of filter networks are used, networks A, B, and C and parasitic components in switch element 1610 are integrated into one filter prototype structure by choosing appropriate values for the components in the networks such that networks A, B, C and switch element 1610 together constitute a single filter structure instead of two serially connected filter structures between directional coupler 120 and a selected antenna 124. Therefore, loss of signal strength is minimized and signal quality is maximized.

Referring again to FIG. 1A, in one embodiment of the present invention, RX chain 130 includes I-branch 140 configured to generate at least one in-phase signal I-SIG and/or I based on the RF signal received from the tag, and Q-branch 150 configured to generate at least one quadrature signal Q-SIG and/or Q based on the RF signal received from the tag. RX chain 130 further includes splitter 132 configured to receive the RF signal from the directional coupler 130 and to split the received RF signal into two RF_receive signals going separately into the I-branch 140 and the Q-branch 150. RX chain 130 further includes a 90° (quarter wavelength) hybrid 134 configured to receive the RX LO signal from the splitter 108 and to split the RX LO signal into a first LO signal in-phase with the RX LO signal and going into the I-branch 140, and a second LO signal with a 90° phase shift from the RX LO signal and going into the Q-branch 150.

I-branch 140 and Q-branch 150 function to demodulate ASK or EPCglobal class-1 signals from the tags and may include conventional heterodyne or super-heterodyne topology for I/Q demodulators. As shown in FIG. 1A, I-branch 140 includes a mixer 141 excited by the first LO signal and configured to convert the RF_receive signal into a first intermediate frequency (IF) signal. The RF_receive signal may be filtered by a preselection filter (not shown), amplified by a low-noise amplifier (not shown) and then further filtered by a second preselection filter (not shown) before being applied to mixer 141. I_branch 140 further includes a first low-pass filter 142 coupled to mixer 141 and configured to filter out the LO signal component in the first IF signal, at least one baseband gain amplifier 144 coupled to low-pass filter 142, and a second low-pass filter 146 coupled to baseband gain amplifier(s) 146 and configured to filter out noises caused by the baseband gain amplifier(s) 144. The output of filter 146 is the in-phase signal I_SIG. I-branch 140 may further include a comparator functioning as an analog to digital (A/D) converter 148 configured to generate a digital in-phase signal I from the I_SIG signal. Both I_SIG and I signals are provided to controller 164.

Likewise, Q-branch 150 includes a mixer 151 excited by the second LO signal and configured to convert the RF_receive signal into a second IF signal. As in the I-branch, the RF_receive signal may be filtered by a preselection filter, amplified by a low-noise amplifier and then further filtered by a second preselection filter before being applied to mixer 151. Q_branch 150 further includes a first low-pass filter 152 coupled to the mixer and configured to filter out the LO signal component in the second IF signal, at least one baseband gain amplifier 154 coupled to low-pass filter 152, and a second low-pass filter 156 coupled to baseband gain amplifier(s) 152 and configured to filter out noises caused by the baseband gain amplifier(s). The output of filter 156 is the quadrature signal Q_SIG. Q-branch may further include a comparator functioning as an A/D converter 158 configured to convert the Q_SIG signal into a digital quadrature signal Q. Both Q_SIG and Q signals are provided to the controller 164.

For a typical mixer and a given IF frequency, there are two signals that can produce the same IF output from mixer 141 or 151. If one of these outputs is considered to be the desired signal, the other one is commonly referred to as an image because the two signals are mirror images of each other with respect to the LO frequency. The image signal affects the sensitivity of RX chain 130 and should be rejected. When the IF frequency is relatively high so that the desired signal and the image are relatively far from each other in frequency, a preselection filter can be placed in the signal paths before the mixers to suppress not only out-of-band signals but also the image signal. For relatively low IF frequency, however, the desired signal and the image signal are relatively close to each other in frequency and a preselection filter is usually not adequate for filtering out the image signal. A relatively low IF frequency is often preferred because it allows the use of monolithically integrable filters to perform channel filtering in a FSK receiver configured to demodulate class 0 signals received from certain types of RFID tags.

To solve the image problem associated with a low IF frequency and to demodulate FSK or EPCglobal class_0 signals, RX chain 130 further includes an image reject mixer (IRM) path 136 and an FSK receiver 138 coupled to an output of IRM path 136. IRM path 136 is configured to received the filtered first and second IF signals from filters 142 and 152, respectively, and to produce an output with the image signal suppressed. Thus, together with mixers 141 and 151 and filters 142 and 152, IRM path 136 form an image reject mixer for rejecting image signals. The image reject mixer shares mixers 141 and 151 and filters 142 and 152 with the I and Q demodulators in the I- and Q-branches 140 and 150.

Figure 17:
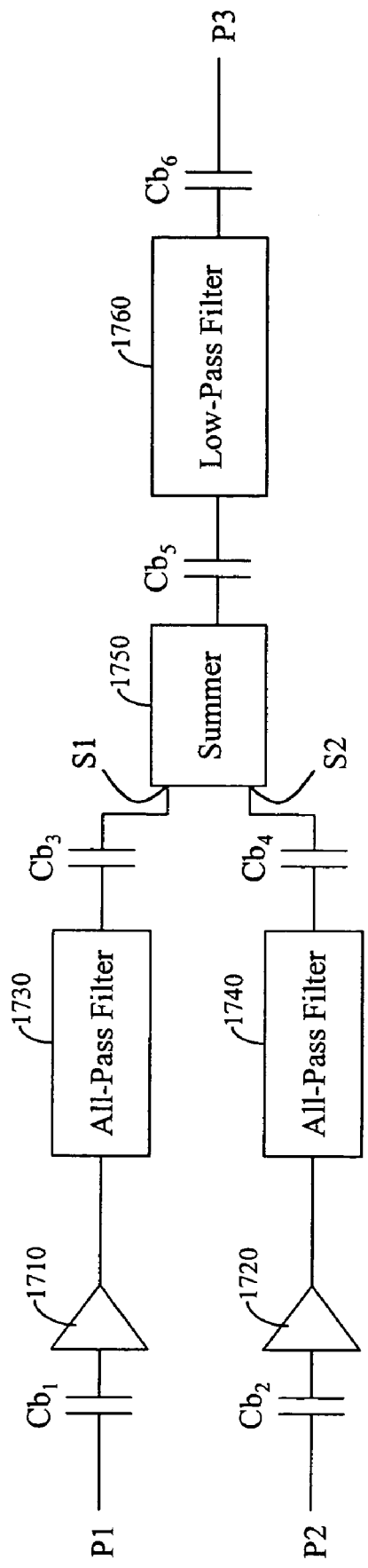
FIG. 17 is a block diagram of an IRM path in the RFID reader according to one embodiment of the present invention.

FIG. 17 is a block diagram of IRM path 136 according to one embodiment of the present invention. As shown in FIG. 17, IRM path 136 has two input ports P1 and P2 connected to filters 152 and 142, respectively, and an output port P3 connected to FSK receiver 138. IRM path 136 further includes first and second buffer amplifiers 1710 and 1720 receiving signals from filters 152 and 142 though input ports P1 and P2, respectively, first and second all-pass filters 1730 and 1740 coupled to first and second buffer amplifiers 1710 and 1720, respectively, a summer 1750 having a first input S1 coupled to the first all-pass filter 1730 and a second input S2 coupled to the second all-pass filter 1740, and a low-pass filter network 1760 coupled to an output of summer 1750. IRM path 136 further includes blocking capacitors $Cb_1$ and $Cb_2$ inserted between input ports P1 and P2 and buffer amplifiers 1710 and 1720, respectively, $Cb_3$ and $Cb_4$ inserted between all-pass filter 1730 and the first input S1 of summer 1750 and between all-pass filter 1740 and the second input S2 of summer 1750, respectively, $Cb_5$ inserted between summer 1750 and low-pass filter 1760, and $Cb_6$ inserted between low-pass filter 1760 and output port P3. The blocking capacitors function to create a low frequency roll-off in the output spectrum of IRM path 136, as explained in more detail below.

Buffer amplifiers 1710 and 1720 may include conventional buffer amplifier circuits configured to amplify signals from filters 152 and 142, respectively, and to provide low-source impedance to all-pass filters 1730 and 1740, respectively. All-pass filters 1730 and 1740 are configured to alter the phase response of signals from buffer amplifier 1710 and 1720, respectively, without changing the amplitude of the signals. In one embodiment of the present invention, all-pass filter 1730 is configured to cause a first phase shift in the signal from filter 1730, and all-pass filter 1740 is configured to cause a second phase shift in the signal from filter 1730, resulting in a 90° total relative phase shift between the two signals.

TABLE 2

| Component name | Value | Units |
|---|---|---|
| Transistor 1711 | BFS17W | |
| $R_{11}$ | 2.21 | kΩ |
| $R_{12}$ | 1.50 | kΩ |
| $R_{13}$ | 2.0 | Ω |
| $R_{14}$ | 634 | Ω |
| $C_{11}$ | 0.1 | μF |

TABLE 3

| Component name | Value | Units |
|---|---|---|
| Transistor 1711 | BFS17W | |
| $R_{21}$ | 2.21 | kΩ |
| $R_{22}$ | 1.50 | kΩ |
| $R_{23}$ | 2.0 | Ω |
| $R_{24}$ | 634 | Ω |
| $C_{21}$ | 0.1 | μF |

Figure 18:
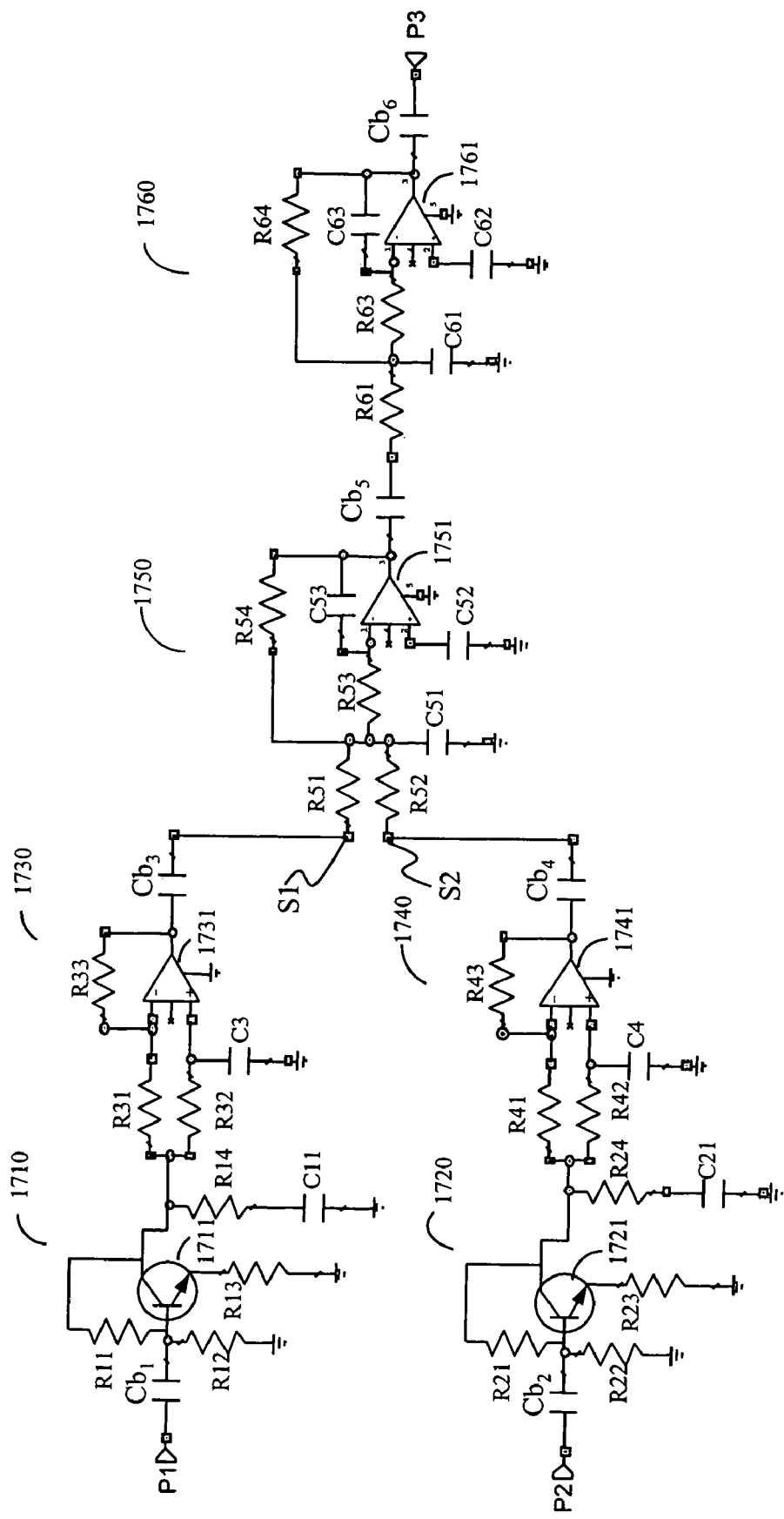
FIG. 18 is a circuit schematic of an all-pass filter in the IRM path according to one embodiment of the present invention.

FIG. 18 illustrates a circuit schematic of IRM 136 according to one embodiment of the present invention. As shown in FIG. 18, buffer amplifier 1710 includes a transistor 1711 having its base connected to input port P1 through blocking capacitor $Cb_1$ and to ground through a resister $R_{12}$, its emitter connected to ground through resistor $R_{13}$, and its collector connected to its base through resister $R_{11}$ and to ground through resister $R_{14}$ and capacitor $C_{11}$. Likewise, buffer amplifier 1720 includes a transistor 1721 having its base connected to input port P2 through blocking capacitor $Cb_2$ and to ground through a resister $R_{22}$, its emitter connected to ground through resistor $R_{23}$, and its collector connected to its base through resister $R_{21}$ and to ground through resister $R_{24}$ and capacitor $C_{21}$. Tables 2 and 3 list exemplary selections of components in buffer amplifier 1710 and 1720, respectively.

All-pass filter 1730 includes an op-amp 1731 having a first input connected to the collector of transistor 1711 through resistor $R_{31}$, a second input connected to the collector of transistor 1711 through resistor $R_{32}$ and to ground through capacitor $C_3$, a output coupled to the first input S1 of summer 1750 through block capacitor $Cb_3$ and to the first input of op amp 1731 via a resistor $R_{33}$, and a ground terminal connected to ground. Likewise, all-pass filter 1740 includes an op-amp 1741 having a first input connected to the collector of transistor 1721 through resistor $R_{41}$, a second input connected to the collector of transistor 1721 through resistor $R_{42}$ and to ground through capacitor $C_4$, a output coupled to the second input S2 of summer 1750 through block capacitor $Cb_4$ and to the first input of op-amp 1741 via a resistor $R_{43}$, and a ground terminal connected to ground. The value $R_{ph}$ of resistor $R_{32}$ or $R_{42}$ and the value $C_{ph}$ of capacitor $C_3$ or $C_4$ in all-pass filter 1730 or 1740, respectively, are selected to achieve a desires phase response of all-pass filter 1730 or 1740, respectively, for the IF frequency, because the phase shift Φ through all-pass filter 1730 or 1740 is determined by $R_{ph}$ and $C_{ph}$ according to the following equation:

$$\Phi = \tan^{-1}\left[\frac{\frac{2\varpi_{IF}}{R_{ph}C_{ph}}}{\varpi_{IF}^2 - \left[\frac{1}{R_{ph}C_{ph}}\right]^2}\right]$$

Tables 4 and 5 list exemplary selections of components in all-pass filters 1730 and 1740, respectively.

Although components in Tables 2 to 5 are selected so that all-pass filter 1730 produces the first phase shift and all-pass filter 1740 produces the second phase shift for an IF frequency of about 2–4 MHz. The values of these components and the structure of all-pass filters 1730 and 1740 can be altered without departing from the spirit and scope of the present invention. For example, the first and second phase shifts can be 45° and −45°, 30° and −60°, 10° and −80°, or 90° and 0°, respectively, as long as a 90° relative phase shift results between the signals output from all-pass filters 1730 and 1730.

TABLE 4

| Component name | Value | Units |
|---|---|---|
| Op-amp 1731 | MAX4223 | |
| $R_{31}$ | 2.21 | kΩ |
| $R_{32}$ | 2.21 | kΩ |
| $C_{31}$ | 1.8 | pF |
| $C_{32}$ | 56 | pF |
| $R_{33}$ | 2.21 | kΩ |

TABLE 5

| Component name | Value | Units |
|---|---|---|
| Op-amp 1741 | MAX4223 | |
| $R_{41}$ | 2.21 | kΩ |
| $R_{42}$ | 2.21 | kΩ |

TABLE 5-continued

| Component name | Value | Units |
|---|---|---|
| $C_{41}$ | 1.8 | pF |
| $C_{42}$ | 6.8 | pF |
| $R_{43}$ | 1000 | kΩ |

Summer 1750 is configured to sum the outputs from all-pass filters 1730 and 1740 and output a signal with the image signal greatly suppressed. Consider the following example of desired signal S(t) and its image M(t) in the RF_receive signal:

$$S(t) = A_S \sin[(\omega_{LO} + \overline{\omega}_{IF})t]$$

$$M(t) = A_M \sin[(\omega_{LO} + \overline{\omega}_{IF})t + \Delta\phi]$$

where $A_S$ and $A_M$ are the amplitudes of S(t) and M(t), respectively, $\omega_{LO}$ and $\omega_{IF}$ are the LO and IF frequencies in radius, respectively, and $\Delta\phi$ is the phase difference between S(t) and M(t). The signal $I_{OUT}$ at the output of mixers 141 in I-branch 140 is:

$$I_{OUT} = G[S(t) + M(t)]\sin(\varpi_{LO}t)$$

$$= \frac{G}{2}[A_S \cos(\varpi_{IF}t) + A_M \cos(\varpi_{IF}t + \Delta\phi)]$$

and the output $Q_{OUT}$ at the output of mixer 151 in Q-branch 150 is:

$$Q_{OUT} = G[S(t) + M(t)]\cos(\varpi_{LO}t)$$

$$= \frac{G}{2}[A_S \sin(\varpi_{IF}t) - A_M \sin(\varpi_{IF}t + \Delta\phi)]$$

Thus by creating a 90° relative phase shift between $I_{OUT}$ and $Q_{OUT}$ using all-pass filters 1730 and 1740, and summing the resulting signals using summer 1750, in an ideal situation, the image signals in $I_{OUT}$ and $Q_{OUT}$ should completely cancel out.

The output of summer 1750 is then filtered by low-pass filter network 1760 and then supplied to FSK receiver 138. As shown in FIG. 18, summer 1750 includes an op-amp 1751 having a first input connected to blocking capacitor $Cb_3$ via serially connected resistors $R_{51}$ and $R_{53}$, to blocking capacitor $Cb_4$ via serially connected resistors $R_{52}$ and $R_{53}$, and to ground via resistor $R_{54}$ and a capacitor $C_{51}$. Op-amp 1751 also has a second input connected to ground via a capacitor $C_{52}$, a ground terminal connected to ground, and an output connected to blocking capacitor $Cb_5$, to the first input through a capacitor $C_{53}$, and to ground through a resistor $R_{54}$ and capacitor $C_{51}$.

Low-pass filter 1760 includes an op-amp 1761 having a first input connected to blocking capacitor $Cb_5$ via serially connected resistors $R_{61}$ and $R_{63}$ and to ground via resistor $R_{63}$ and a capacitor $C_{61}$. Op-amp 1761 also has a second input connected to ground via a capacitor $C_{62}$, a ground terminal connected to ground, and an output connected to blocking capacitor $Cb_6$, to the first input through a capacitor $C_{63}$, and to ground through a resistor $R_{64}$ and capacitor $C_{61}$.

In one embodiment of the present invention, component values in summer 1750 and low-pass filter 1760 are integrated into one low-pass filter prototype structure such that the low-pass filter prototype structure and summer 1750 share op-amp 1751 and components associated therewith, such as resistors $R_{53}$ and $R_{54}$, and capacitors $C_{51}$, $C_{52}$, and $C_{53}$. In the example shown in FIG. 18, the low-pass filter prototype structure comprising summer 1750 and filter network 1760 is a two element low-pass filter network having a first op-amp, op-amp 1751, and a second op-amp, op-amp 1752. Table 6 lists exemplary selections of the components in summer 1750 and low-pass filter 1760 according to one embodiment of the present invention.

The values of the blocking capacitors $Cb_1$, $Cb_2$, $Cb_3$, $Cb_4$, $Cb_5$, and $Cb_6$ are selected such that IRM path 136 also has a high-pass function with a fast low-frequency roll-off in its frequency response. Table 7 lists the exemplary values of the blocking capacitors in one implementation of IRM 136.

TABLE 6

| Component name | Value | Units |
|---|---|---|
| Op-amp 1751 | AD8039 | |
| Op-amp 1761 | AD8039 | |
| $R_{51}$ | 475 | Ω |
| $R_{52}$ | 536 | Ω |
| $R_{61}$ | 634 | Ω |
| $R_{53}/R_{63}$ | 330/330 | Ω |
| $R_{54}/R_{64}$ | 1000/634 | Ω |
| $C_{51}/C_{61}$ | 470/680 | pF |
| $C_{52}/C_{62}$ | 22000/22000 | pF |
| $C_{53}/C_{63}$ | 27/12 | pF |

TABLE 7

| $Cb_1$ | $Cb_2$ | $Cb_3$ | $Cb_4$ | $Cb_5$ | $Cb_6$ |
|---|---|---|---|---|---|
| 3300 pF | 3300 pF | 110 pF | 100 pF | 330 pF | 330 pF |

The component values in IRM 136 are also selected to maintain symmetry for signals passing from port P1 to port P3 and for signals passing from port P2 to port P3. However, because of different phase shifts caused by all-pass filters 1730 and 1740, values of resistor $R_{32}$ and capacitor $C_3$ are different from corresponding values of resistor $R_{42}$ and capacitor $C_4$. As a consequence, values of resistor $R_5$, and $R_{52}$ are adjusted and values of blocking capacitor $Cb_3$ and $Cb_4$ are also adjusted so as to compensate the difference in output impedance of all-pass filter 1730 from that of all pass filter 1740. This way, a first source impedance to the first input S1 of summer 1750 contributed by a first branch of IRM path 136 including capacitor $Cb_1$, buffer amplifier 1710, all-pass filter 1730 and capacitor $Cb_3$ and a second source impedance to the second input S2 of summer 1750 contributed by a second branch of IRM path 136 including capacitor $Cb_2$, buffer amplifier 1720, all-pass filter 1740 and capacitor $Cb_4$ will be equal or nearly equal. Therefore, signals passing from port P1 to port P3 and from port P2 to Port P3 will be equally or nearly equally weighted in the summation carried out by summer 1750.

Figure 19A:
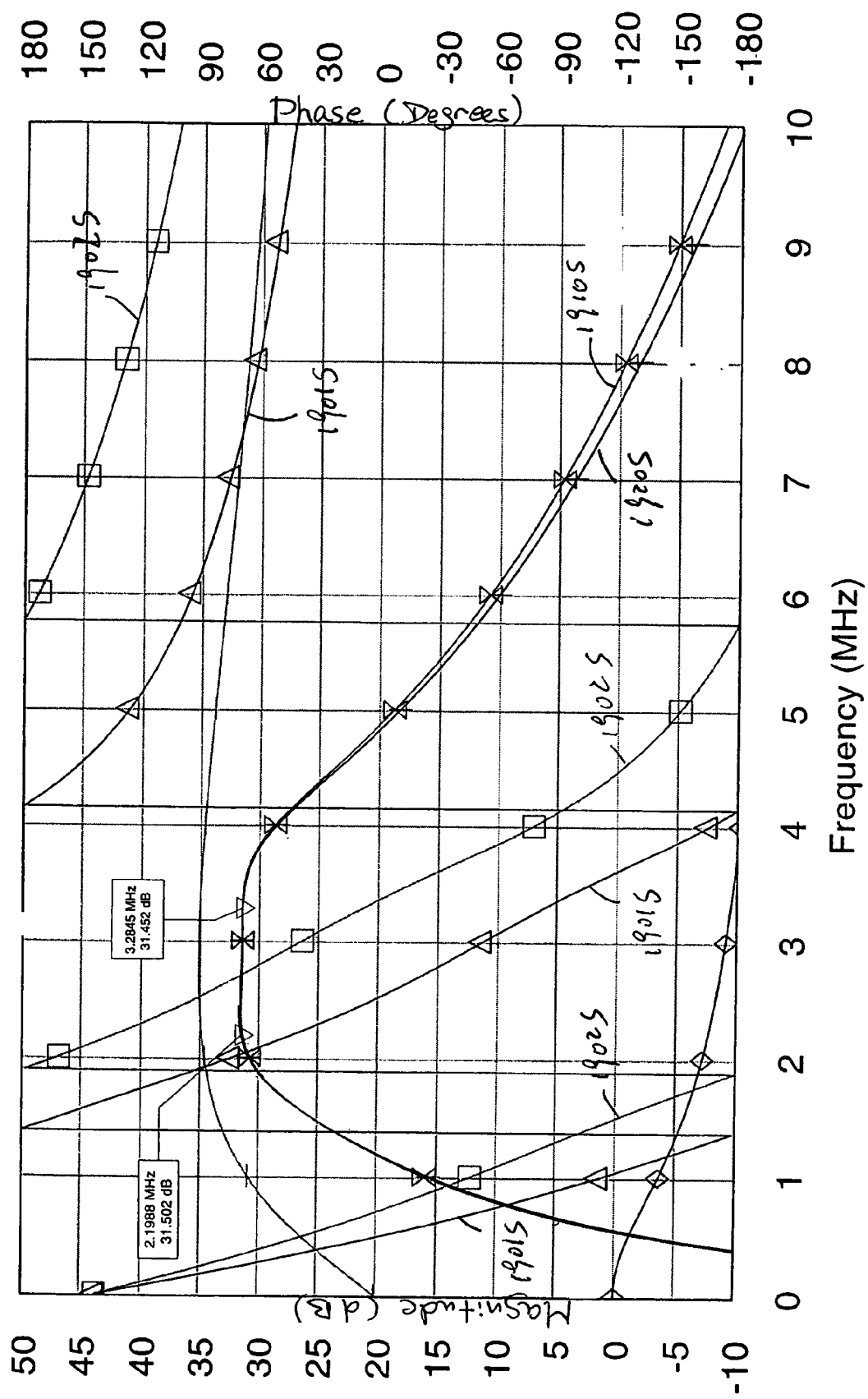
FIGS. 19A and 19B are plots of simulated and measured phase and frequency response of the IRM path according to one embodiment of the present invention.
Figure 19B:
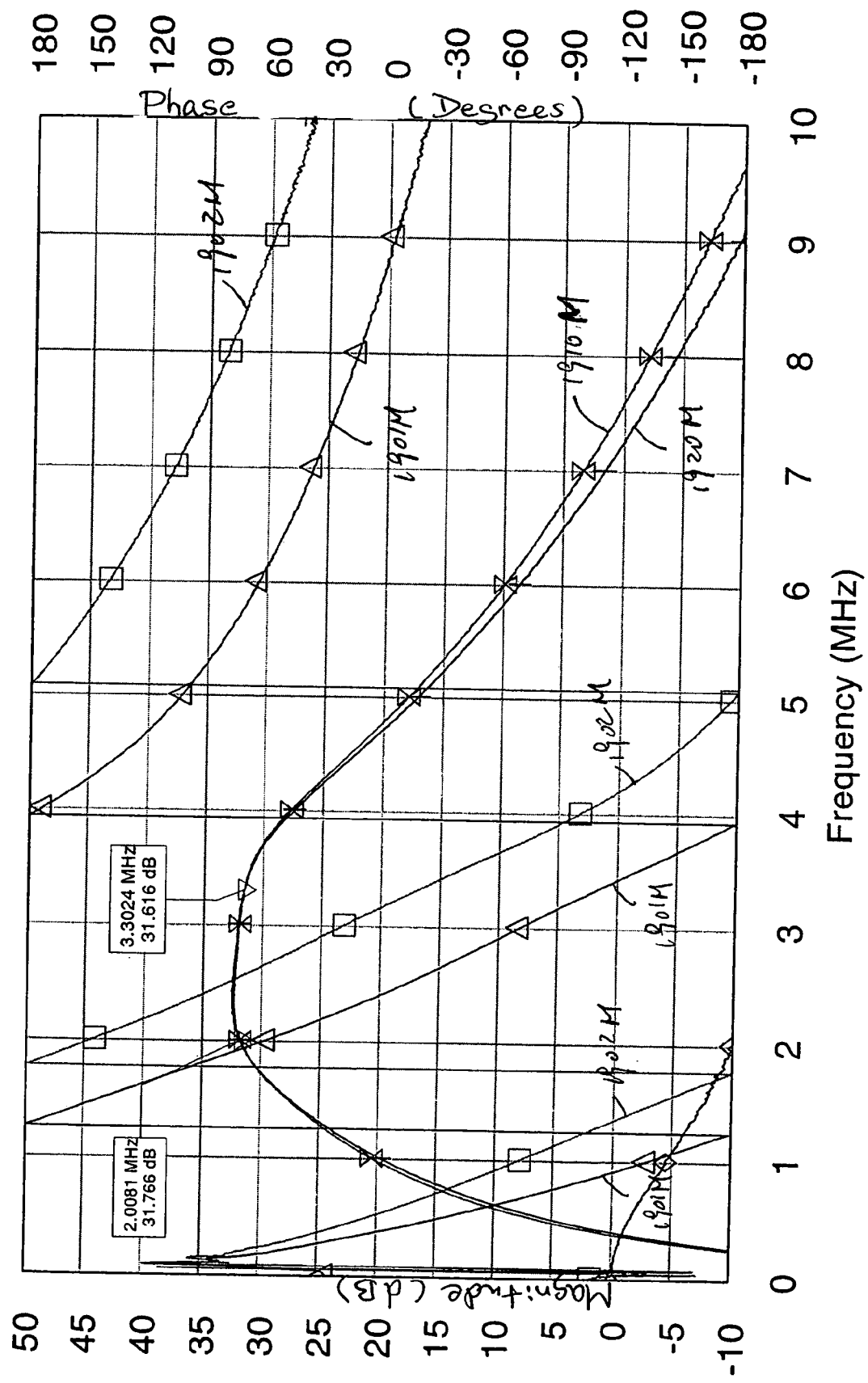

FIGS. 19A and 19B illustrate simulated and measured phase response of IRM path 162, respectively. As shown in FIGS. 19A and 19B, curves 1901S and 1901M are the simulated and measured phase response of IRM path 136, respectively, for input signals supplied to input port P1 while input port P2 is held to a constant voltage, and curves 1902S and 1902M are the simulated and measured phase response of IRM path 136, respectively, for input signals supplied to input port P2 while input port P1 is held to a constant voltage.

FIGS. 19A and 19B also illustrate simulated and measured frequency response of IRM path 162, respectively. As shown in FIGS. 19A and 19B, curves 1910S and 1910M are the simulated and measured frequency response of IRM path 136, respectively, for input signals supplied to input port P1 while input port P2 is held to a constant voltage, and curves 1920S and 1920M are the simulated and measured frequency response of IRM path 136, respectively, for input signals supplied to input port P2 while input port P1 is held to a constant voltage. As shown in FIGS. 19A and 19B, IRM path 136 functions as a band-pass filter having fast low-offs in its frequency response for frequencies below 2 MHz and above 4 MHz.

Figure 19C:
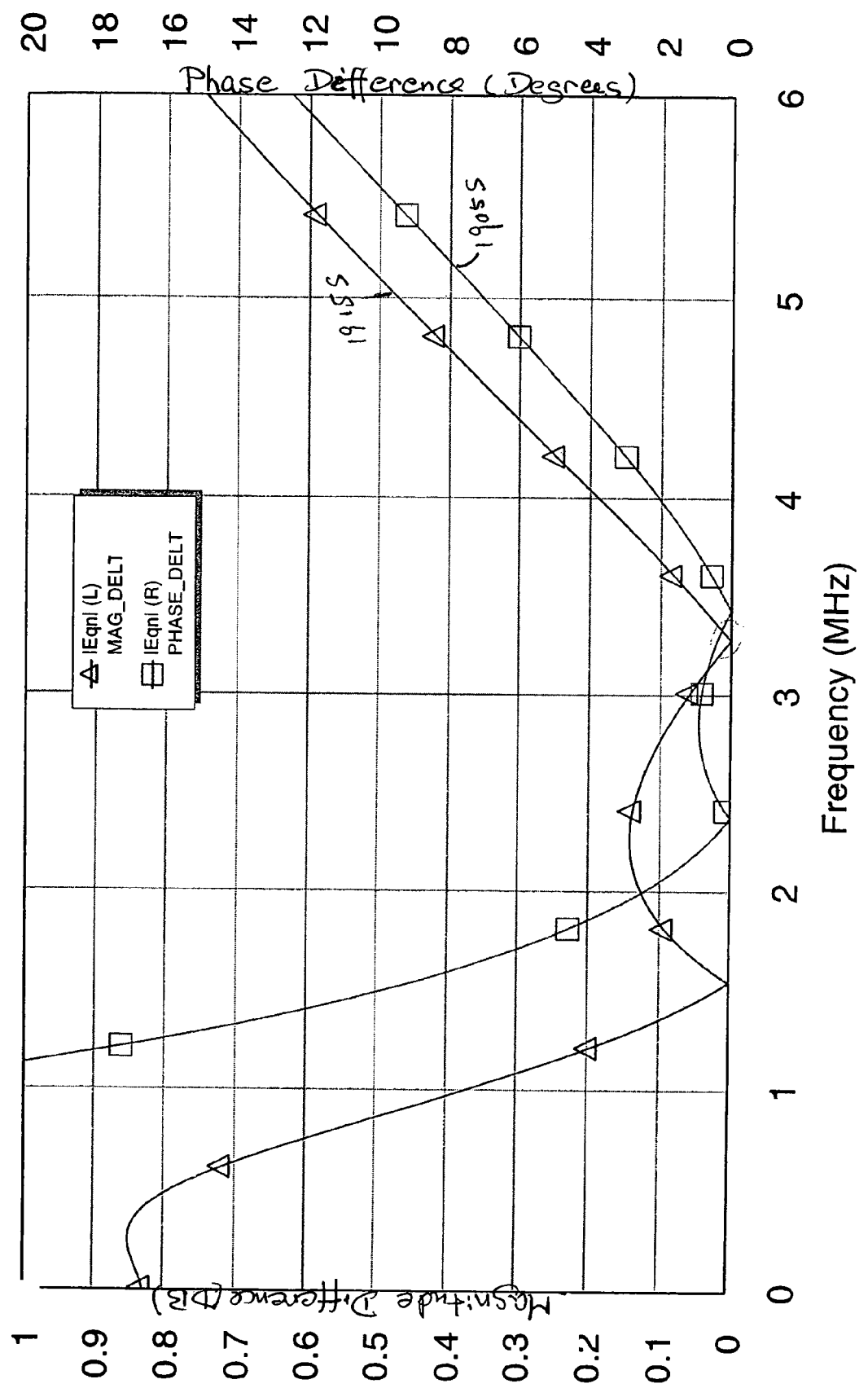
FIGS. 19C and 19D are difference plots of simulated and measured phase and frequency response of the IRM path according to one embodiment of the present invention.
Figure 19D:
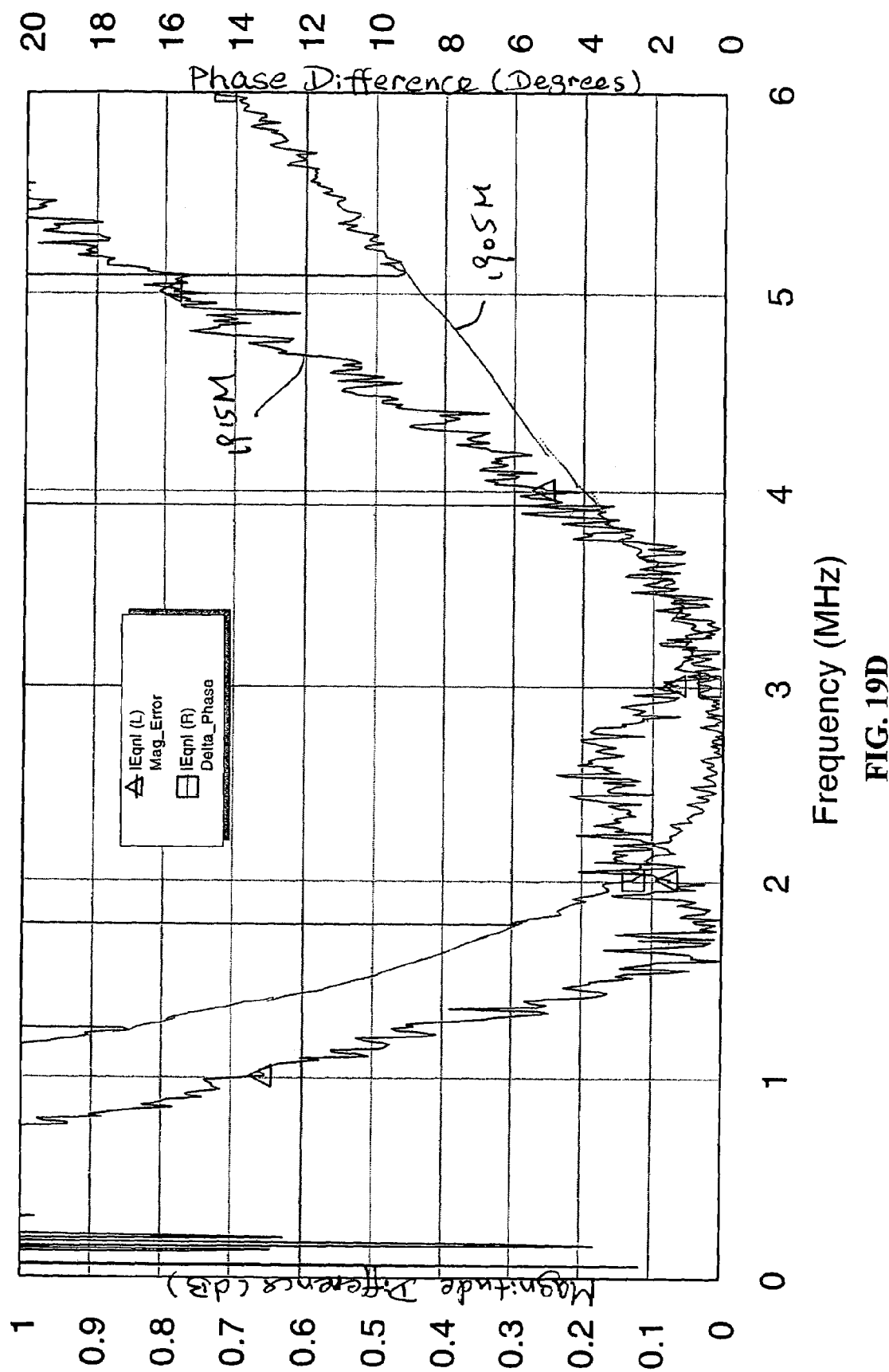

FIG. 19C shows a difference curve 1905S, which is a plot of the difference between curve 1901S and 1902S, and a difference curve 1915S, which is a plot of the difference between curve 1910S and 1920S. FIG. 19D shows a difference curve 1905M, which is a plot of the difference between curve 1901M and 1902M, and a difference curve 1915M, which is a plot of the difference between curve 1910M and 1920M. As shown in FIGS. 19A and 19B, difference curves 1905S, 1905M, 1915S, and 1915M all have small values between the desired frequency band between 2–4 MHz, indicating the effectiveness of the IRM mixer comprising IRM path 136 in rejecting image signals.

Referring again to FIG. 1A, FSK receiver 138 can be a conventional FSK receiver that is configured to demodulate FSK signals and produces two outputs, an FSK_CD output and an FSK_Data output. A/D converter 174 receives the FSK_CD output and converts it into the FSK_CD signal that is supplied to controller 164. The FSK_Data output goes through low-pass filter 172 and A/D converter 176 and becomes FSK_Data signal that is also supplied to controller 164. In one embodiment of the present invention, A/D converters 174 and 176 are implemented using comparators.

Controller 164 selects the in-phase, quadrature, or FSK signals for further processing based on their relative strength and/or other indications of reliability.

Optionally, a single adjustable phase shifter 170 may be placed in either TX chain 110, or RX chain 130 to improve sensitivity, as shown in FIG. 1. Alternatively, dual phase shifters (not shown) may be placed in I and Q branches 140 and 150, respectively, though this is not normally required. The phase shifter 170 is adjusted to minimize conversion of phase modulation (or phase noise) in the LO signal into amplitude noise at baseband. This action can be understood by considering the multiplication of first and second signals of equal frequency, the first signal (the LO signal) being characterized by a fixed phase offset $\phi_o$ and a variable phase noise $\delta\phi$ of zero average value with respect to the second signal (e.g., the RF_receive signal):

$$V_m = V_{LO} \sin(\omega t + \phi_o + \delta\phi) \cdot V_{RF} \sin(\omega t)$$

The product can be re-expressed as a sum:

$$V_m = \frac{V_{LO} V_{RF}}{2} \{\cos(\phi_o + \delta\phi) + \cos(2\omega t + \phi_o + \delta\phi)\}$$

After low-pass filtering only the first component in the sum remains:

$$V_{filtered} = \frac{V_{LO} V_{RF}}{2} \{\cos(\phi_o + \delta\phi)\}$$

The sensitivity of the filtered output voltage to the small phase noise component is obtained by taking the derivative of this expression:

$$\frac{1}{V_{filtered}} \frac{dV_{filtered}}{d(\delta\phi)} = \frac{-\sin(\phi_o)}{\cos(\phi_o)} = -\tan(\phi_o)$$

Thus if the phase offset is equal to 0 or multiples of π radians, the filtered output is to first order completely insensitive to phase noise in the local oscillator. A phase offset of π/2 radians would result in a null in the desired signal voltage and thus the output being dominated by the phase noise. This situation, however, is not of interest as the weaker signal (I or Q) would then be rejected by the signal processing logic in controller 164 and discarded. Of practical importance is the comparative case where the I and Q local oscillator signals are both π/4 radians from the optimal condition so that $$\frac{1}{V_{filtered}} \frac{dV_{filtered}}{d(\delta\phi)} = -\tan\left(\pm\frac{\pi}{4}\right) = \mp 1$$

that is, the phase noise in the LO acts to directly modulate the filtered output signal intensity, with the same effect on I and Q. The signal processing logic in controller 164 would select either I or Q as the input signal, resulting in a loss of sensitivity because the frequency synthesizer phase noise is being integrated into the baseband bandwidth. Since phase noise is often very close to the carrier (<100 KHz away), and typical RFID tags use signals with very low modulation rates, such that all the power is contained within typically 6 to 200 KHz of the carrier, failure to reject the phase noise can result in a noticeable degradation in sensitivity. The use of the adjustable phase shifter 170 enables the chosen I or Q branch to be optimized for phase noise rejection. An improvement of as much as 15–20 dB in IF phase noise is found when an appropriate phase shifter is employed according to one embodiment of the present invention.

Figure 20:
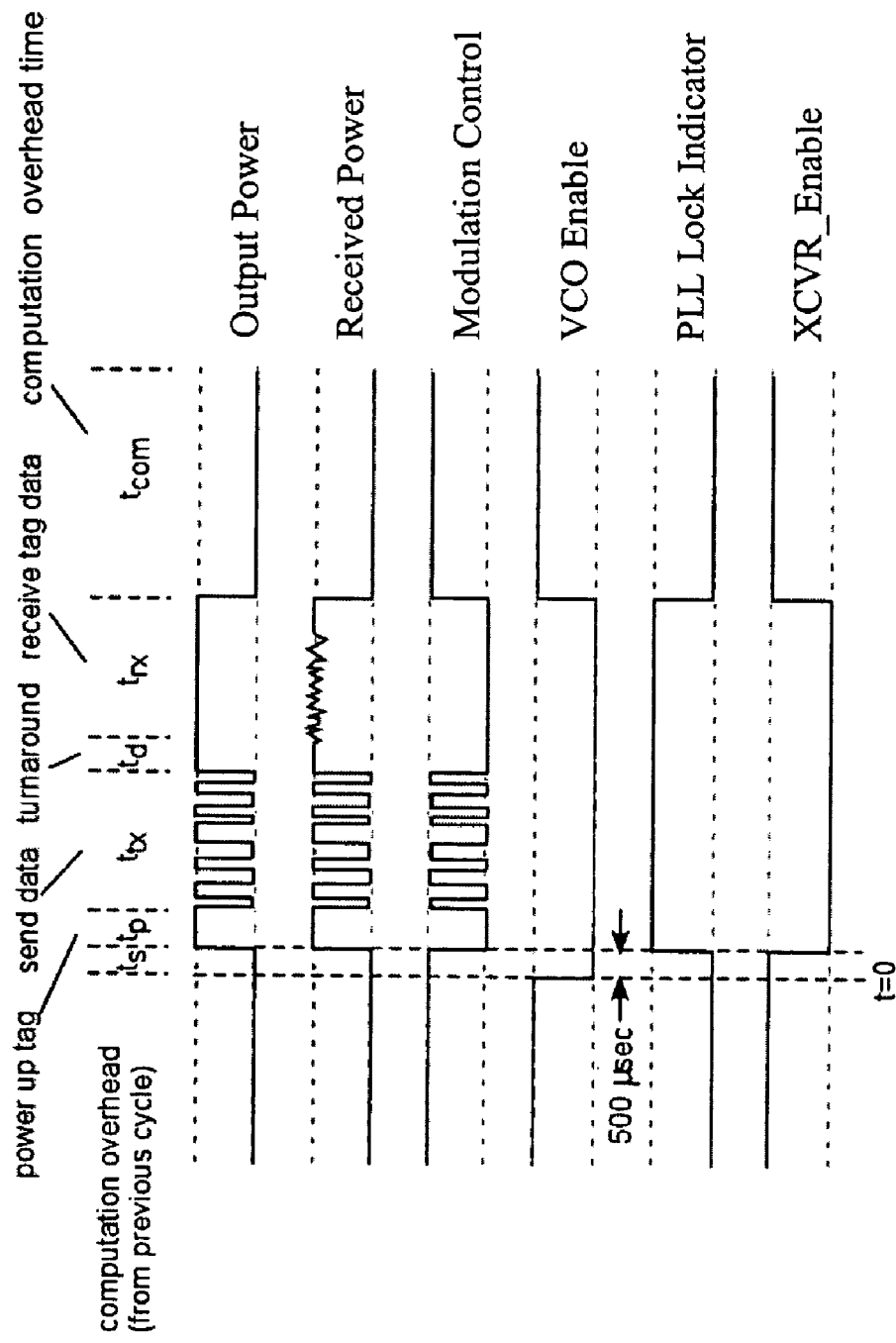
FIG. 20 is a timing diagram of various signals in the RFID reader according to one embodiment of the present invention.

FIG. 20 is a timing diagram illustrating the operation of reader 100 according to one embodiment of the present invention. As shown in FIG. 20, the timing of the operation of reader 100 is controlled by a plurality of control signals including a VCO enable control voltage, a PLL Lock indicator, and a XCVR_Enable voltage. At time t=0, reader 100 initiates an interrogation cycle by sending a command to frequency synthesizer 104 to lock to the desired multiple of the reference frequency. Typically a short delay, e.g., on the order of 100 μsec, is encountered before frequency synthesizer 104 achieves phase lock at the desired transmit frequency. During this time, the VCO_Enable control voltage is held low, thus turning on VCO 202, LO buffer amplifier 106, and receiver baseband gain amplifiers 144 and 154, but not the power amplifiers in TX chain 110. Buffer amplifier 106 must be powered up when frequency synthesizer 104 is attempting to lock to the desired frequency so as to isolate the synthesizer transient disturbances from output load changes. When synthesizer 104 reaches a stable phase-locked output after a time period $t_s$, the PLL_lock indicator voltage goes high and the XVCR_ENABLE voltage is pulled low, turning on the power amplifiers in TX chain 110. Reader 100 then transmits a continuous-wave (CW) output signal for a period $t_p$, which is set by a requirement to provide enough transmitted power to enable passive tags to store power and activate themselves, and may be fixed by a published standard. After $t_p$, the modulator control MOD is actuated to send data, shown illustratively in FIG. 20 as variations in the output power. The duration of a modulation period $t_{tx}$ may also be fixed by reference to a standard. After time $t_{tx}$, CW output is restored for some turnaround time $t_d$, after which, a tag which has been addressed by the interrogator responds by modulating the load connected to its antenna, thus inducing a modulation in the received power as shown in FIG. 20. The CW output power is maintained for a time $t_{rx}$, which is also typically specified by the applicable operating standard, and is chosen to allow time for all data to be transmitted from a most distant envisioned tag. Reader 100 then incurs an overhead required to process all the data received during this interrogation cycle, including possible communications with a networked or local control device in order to receive instructions for the next action. During this overhead time, the VCO Enable voltage and a SCVR_Enable voltage (not shown) are both pulled high, turning off VCO 202 and the voltage to the RF components and thus considerably reducing a total power consumed by reader 100.

This invention has been described in terms of a number of embodiments, but this description is not meant to limit the scope of the invention. Numerous variations will be apparent to those skilled in the art, without departing from the spirit and scope of the invention disclosed herein. Furthermore, certain aspects of the present invention have been described in terms of components in an RFID reader, while these components may be used outside of an RFID reader in other applications.

I claim:

1. An RFID reader accessible through a computer system for interrogating at least one RFID tag, comprising:
   a frequency synthesizer configured to generate a continuous wave signal;
   a controller coupled to the computer system through a PC card interface and configured to generate a plurality of control signals, the controller and the PC card interface both operate based on a clock signal generated by a crystal oscillator that is referenced by the frequency synthesizer in generating the continuous wave signal, and wherein a frequency of the clock signal is about 14.75 MHz or an integer multiple of 14.75 MHz;
   a transmit chain configured to form a transmit signal from a first portion of the continuous wave signal according to at least one of the control signals;
   a frequency divider coupled between the crystal oscillator and the controller; and
   a receive chain configured to form a plurality of signals for extracting information associated with the RFID tag based on a received signal from the RFID tag and a second portion of the continuous wave signal;
   wherein the frequency synthesizer, the controller, the transmit chain, and the receive chain are inter-coupled within a housing suitable for plugging in a PCMCIA slot of the computer system.

2. The reader of claim 1 wherein the transmit chain comprises a linearized power amplifier modulator, which comprises:
   a ramp generator configured to receive a modulation control signal from the controller and to generate a ramp signal based on the modulation control signal;
   a current mirror coupled to the ramp generator and configured to generate a reference current based on the ramp signal; and
   a power amplifier receiving the reference current at a bias input and at least a portion of the continuous wave signal at a signal input and configured to output the transmit signal.

3. The reader of claim 2 wherein the control signal comprises step transitions, the ramp signal comprises linear ramps each ramping a corresponding step transition over a ramp time period.

4. The reader of claim 2 wherein the ramp signal is a voltage signal and the reference current is linearly proportional to the ramp signal.

5. The reader of claim 4 further comprising a low-pass filter coupled to the output of the ramp generator and configured to smooth the ramp signal.

6. The reader of claim 1 further comprising a switching device coupled to the transmit chain and configured to connect at least one of a plurality of antennas to the transmit chain based on an antenna select control signal from the controller, the switching device comprising:
   first, second, and third filter networks, and
   a switch element coupled to the controller and between the first filter network and the second and third filter networks and configured to connect either the second or the third filter network to the first filter network; and
   wherein parasitic components associated with the switch element and the first, second and third filter networks are integrated into one low-pass filter prototype structure.

7. The reader of claim 6 wherein the second and third filter networks are substantially matched such that each component in the second filter network matches a corresponding component in the third filter network.

8. The reader of claim 7 wherein the first, second and third filter networks comprise inductors and capacitors, and wherein values of inductors or capacitors in the first, second and third networks are selected to account for values of the parasitic components in the switch element such that the switching device constitutes one low-pass filter prototype structure.

9. The reader of claim 1 wherein the receive chain generates at least one in-phase signal, at least one quadrature signal, and at least one frequency-shift-keying (FSK) signal.

10. The reader of claim 9 wherein the receive chain comprises:
    an in-phase demodulator configured to generate the at least one in-phase signal;
    a quadrature demodulator configured to generate the at least one quadrature signal;
    a image reject mixer (IRM) coupled to the in-phase and quadrature demodulators; and
    a frequency shift keying (FSK) receiver coupled to the IRM and configured to generate the at least one FSK signal.

11. The reader of claim 10 wherein the IRM and the in-phase demodulator share a first mixer and the IRM and the quadrature demodulator share a second mixer, the IRM further comprising:

a first all-pass filter coupled to the in-phase demodulator and configured to cause a first phase shift in a first intermediate frequency (IF) signal from the in-phase demodulator;

a second all-pass filter coupled to the quadrature demodulator and configured to cause a second phase shift in a second IF signal from the quadrature demodulator; and a summer coupled to first and second all-pass filter networks and configured to generate an output that is a sum of the first IF signal from the first all-pass filter and the second IF signal from the second all-pass filter; and wherein each of the first and second all-pass filters comprises an op-amp with associated components, and wherein component values in the first all-pass filter and the second all-pass filter are selected such that a total relative phase shift between the first IF signal from the first all-pass filter and the second IF signal from the second all-pass filter is 90°.

12. The reader of claim 11 further comprising a low-pass filter structure wherein the summer is integrated in the low-pass filter structure and shares at least one operational amplifier with the low-pass filter structure.

13. The reader of claim 11 further comprising blocking capacitors inserted at specified locations in the IRM, wherein capacitance values of the blocking capacitors are selected such that the IRM has a high-pass function to filter out frequencies below a predetermined band of IF frequencies.

14. The reader of claim 1 further comprising a power detector and an output power control module, the power detector being coupled to the transmit and receive chains and configured to detect a signal power level in the receive chain and to provide a feedback to the transmit chain, the output power control module being configured to adjust a power level in the transmit signal according to the feedback.

15. The reader of claim 14 wherein the power detector generates an additional signal to indicate a possible antenna fault.

16. An RFID reader capable of interrogating EPCglobal class_0 and class_1 RFID tags, comprising:

a frequency synthesizer configured to generate a local oscillator signal;

an RF receiver configured to receive the local oscillator signal from the frequency synthesizer and an RF signal from an RFID tag and to generate at least one in-phase signal, at least one quadrature signal, and at least one frequency-shift-keying (FSK) signal based on the RF signal and the local oscillator signal;

wherein the RF receiver further comprises:

an in-phase demodulator configured to generate the at least one in-phase signal;

a quadrature demodulator configured to generate the at least one quadrature signal;

an image reject mixer (IRM) coupled to the in-phase and quadrature demodulators;

a frequency shift keying (FSK) receiver coupled to the IRM and configured to generate the at least one FSK signal; and an adjustable phase shifter coupled between the frequency synthesizer and in-phase and quadrature demodulators and configured to cause an adjustable phase shift in the local oscillator signal so as to minimize conversion of phase noise in the local oscillator signal into amplitude noise in the in-phase and quadrature signals.

17. The reader of claim 16 wherein the IRM and the in-phase demodulator share a first mixer configured to generate a first intermediate frequency (IF) signal by mixing a first portion of the RF signal with a first portion of the local oscillator signal, and the IRM and the quadrature demodulator share a second mixer configured to generate a second IF signal by mixing a second portion of the RF signal and a phase-shifted second portion of the local oscillator signal, the IRM further comprising:

a first all-pass filter coupled to the in-phase demodulator and configured to cause a first phase shift in the first IF signal from the in-phase demodulator;

a second all-pass filter coupled to the quadrature demodulator and configured to cause a second phase shift in the second IF signal from the quadrature demodulator; and a summer coupled to first and second all-pass filter networks and configured to generate an output that is a sum of the first IF signal from the first all-pass filter and the second IF signal from the second all-pass filter; and wherein each of the first and second all-pass filters comprises an op-amp with associated components, and wherein component values in the first and second all-pass filters are selected such that a total relative phase shift between the first IF signal and the second IF signal is 90° or nearly 90°.

18. The reader of claim 17 wherein the IRM further comprises a first buffer amplifier coupled between the first mixer and the first all-pass filter and a second buffer amplifier coupled between the second mixer and the second all-pass filter, the first and second buffer amplifiers are substantially identical in configuration.

19. The reader of claim 17 further comprising blocking capacitors placed at specified locations in the IRM, wherein the capacitance values of the blocking capacitors are selected so that the IRM has a high-pass function to filter out frequencies below a predetermined frequency band.

20. The reader of claim 17 wherein the summer includes a first resistor coupled to the first all-pass filter via a first blocking capacitor and a second resistor coupled to the second all-pass filter via a second blocking capacitor wherein values of the first and second resistors and first and second blocking capacitors are selected to compensate for a difference in impedance between the first all-pass filter and the second all-pass filter so that the first IF signal and the second IF signal are equally or nearly equally weighted in the sum generated by the summer.

21. The reader of claim 17 further comprising a low-pass filter structure wherein the low-pass filter structure and the summer are integrated to share at least one operational amplifier.

22. An image reject mixer (IRM) for use with an RF receiver configured to receive a local oscillator signal from a local frequency synthesizer and an RF signal from a remote object, comprising:

a first mixer configured to generate a first intermediate frequency (IF) signal by mixing a first portion of the RF signal with a first portion of the local oscillator signal, a second mixer configured to generate a second IF signal by mixing a second portion of the RF signal and a phase-shifted second portion of the local oscillator signal;

a first all-pass filter coupled to the first mixer and configured to cause a first phase shift in the first IF signal from the in-phase demodulator;

a second all-pass filter coupled to the second mixer and configured to cause a second phase shift in the second IF signal from the quadrature demodulator; and a summer coupled to first and second all-pass filter networks and configured to generate an output that is a sum of the first IF signal from the first all-pass filter and the second IF signal from the second all-pass filter;

blocking capacitors placed at specified locations in the IRM, wherein the capacitance values of the blocking capacitors are selected so that the IRM has a high-pass function to filter out frequencies below a predetermined frequency band; and wherein each of the first and second all-pass filters comprises an op-amp with associated components, and wherein component values in the first and second all-pass filters are selected such that a total relative phase shift between the first IF signal and the second IF signal is 90° or nearly 90°.

23. The IRM of claim 22 wherein the IRM further comprises a first buffer amplifier coupled between the first mixer and the first all-pass filter and a second buffer amplifier coupled between the second mixer and the second all-pass filter, the first and second buffer amplifiers are substantially identical in configuration.

24. The IRM of claim 22 wherein the summer includes a first resistor coupled to the first all-pass filter via a first blocking capacitor and a second resistor coupled to the second all-pass filter via a second blocking capacitor wherein values of the first and second resistors and first and second blocking capacitors are selected to compensate for a difference in impedance between the first all-pass filter and the second all-pass filter so that the first IF signal and the second IF signal are equally or nearly equally weighted in the sum generated by the summer.

25. The IRM of claim 22 further comprising a low-pass filter structure wherein the summer are integrated in the low-pass filter structure and shares at least one operational amplifier with the low-pass filter structure.

26. A method for interrogating an RFID tag, comprising:
generating a clock signal;
generating a continuous wave signal referencing the clock signal;
generating a plurality of control signals;
controlling the generation of the control signals via a PC card interface operating based on the clock signal;
modulating the continuous wave signal according to one of the plurality of control signals;
receiving an RF signal from the RFID tag;
demodulating the RF signal by mixing it with a portion of the continuous wave signal to generate at least one in-phase signal, at least one quadrature signal, and at least one FSK signal;
selecting the at least one in-phase signal, the at least one quadrature signal, or the at least one FSK signal to draw information included in the RF signal from the RFID tag; and
causing an adjustable phase shift in the portion of the continuous wave signal to minimize conversion of phase noise in the continuous wave signal into amplitude noise in the at least one in-phase signal, at least one quadrature signal, and at least one FSK signal.

27. The method of claim 26, further comprising:
generating a ramp signal according to one of the control signals comprising step transitions, the ramp signal comprising linear ramps each corresponding to a step transition in the control signal;
generating a reference current signal according to the ramp signal using a current mirror;
supplying the reference current signal to a power amplifier receiving a portion of the continuous wave signal; and
modulating the continuous wave signal according to the reference current signal using the power amplifier.

28. The method of claim 27 wherein the reference current signal is linearly proportional to the ramp signal.

* * * * *